(12) United States Patent
Cunningham et al.

(10) Patent No.: US 7,500,642 B2
(45) Date of Patent: Mar. 10, 2009

(54) UNIVERSAL SUPPORT AND VIBRATION ISOLATOR

(75) Inventors: John Cunningham, Saratoga Springs, NY (US); Robert E. Roemer, Bolton, MA (US); Robert C. Banasik, Columbus, OH (US)

(73) Assignee: Seicon Limited, Columbus, OH (US)

( * ) Notice: Subject to any disclaimer, the term of this patent is extended or adjusted under 35 U.S.C. 154(b) by 0 days.

(21) Appl. No.: 10/348,036

(22) Filed: Jan. 21, 2003

(65) Prior Publication Data

US 2004/0025952 A1    Feb. 12, 2004

Related U.S. Application Data

(63) Continuation of application No. 10/007,312, filed on Nov. 10, 2001, now abandoned.

(60) Provisional application No. 60/247,290, filed on Nov. 10, 2000.

(51) Int. Cl.
*F16L 3/00* (2006.01)

(52) U.S. Cl. .......................... 248/49; 248/65; 248/67.5; 248/74.1; 186/74; 186/77 R; 192/80; 192/81 R

(58) Field of Classification Search .................. 188/74, 188/77 R, 67; 192/80, 81 R; 248/614, 601, 248/634, 590, 49, 560, 561, 603, 597, 575, 248/576, 577, 604–608, 65, 67.5, 74.1
See application file for complete search history.

(56) References Cited

U.S. PATENT DOCUMENTS

| 1,833,145 | A | * | 11/1931 | Wilhelm | 439/835 |
| 2,055,894 | A | * | 9/1936 | Edwards, Jr. et al. | 248/596 |
| 2,799,778 | A | * | 7/1957 | Stephenson | 331/98 |
| 3,107,966 | A | * | 10/1963 | Bonhomme | 439/843 |
| 3,216,682 | A | * | 11/1965 | Lewis | 248/60 |
| 3,463,426 | A | * | 8/1969 | Waddington, Jr. | 248/560 |
| 3,561,071 | A | * | 2/1971 | Schlein | 403/180 |
| 3,848,842 | A | * | 11/1974 | Jepsen | 248/560 |
| 3,921,257 | A | * | 11/1975 | Appleby et al. | 24/122.6 |
| 4,080,998 | A | * | 3/1978 | Mottola et al. | 137/107 |
| 4,203,647 | A | * | 5/1980 | Bonhomme | 439/851 |
| 4,401,107 | A | * | 8/1983 | Haber et al. | 600/30 |
| 4,553,271 | A | * | 11/1985 | Baker | 623/23.66 |
| 4,674,272 | A | * | 6/1987 | Widmer | 57/135 |
| 4,946,128 | A | * | 8/1990 | Cunningham | 248/560 |
| 5,203,813 | A | * | 4/1993 | Fitzsimmons et al. | 29/876 |
| 5,348,124 | A | * | 9/1994 | Harper | 188/378 |

(Continued)

*Primary Examiner*—Amy J. Sterling
(74) *Attorney, Agent, or Firm*—Porter, Wright, Morris & Arthur, LLP

(57) ABSTRACT

A pipe support is provided that includes a frame capable of being placed around an existing pipe and a plurality of support members within the frame. The frame is a hollow cylinder that includes two connectable halves divided along the diameter of the hollow cylinder. The pipe support includes two bearing rings connected to the frame for supporting each of the plurality of members at a minimum of two contact points. Each of the two bearing rings include bearing points for each support member arranged in a cylindrical pattern concentric with the hollow cylinder frame. The pipe support includes means for rotating each of the support members at a first contact point with respect to a second contact point so that the support members engage a pipe placed within the pipe support. The support members are rods that provide vibration isolation to a pipe placed within the pipe support.

20 Claims, 19 Drawing Sheets

U.S. PATENT DOCUMENTS

| | | | |
|---|---|---|---|
| 5,522,585 A * | 6/1996 | Loziuk | 267/148 |
| 5,556,059 A * | 9/1996 | Maeda et al. | 248/49 |
| 5,655,269 A * | 8/1997 | Sagalovich | 24/115 R |
| 5,857,815 A * | 1/1999 | Bailey et al. | 409/201 |
| 6,164,419 A * | 12/2000 | Tribbett | 188/67 |

* cited by examiner

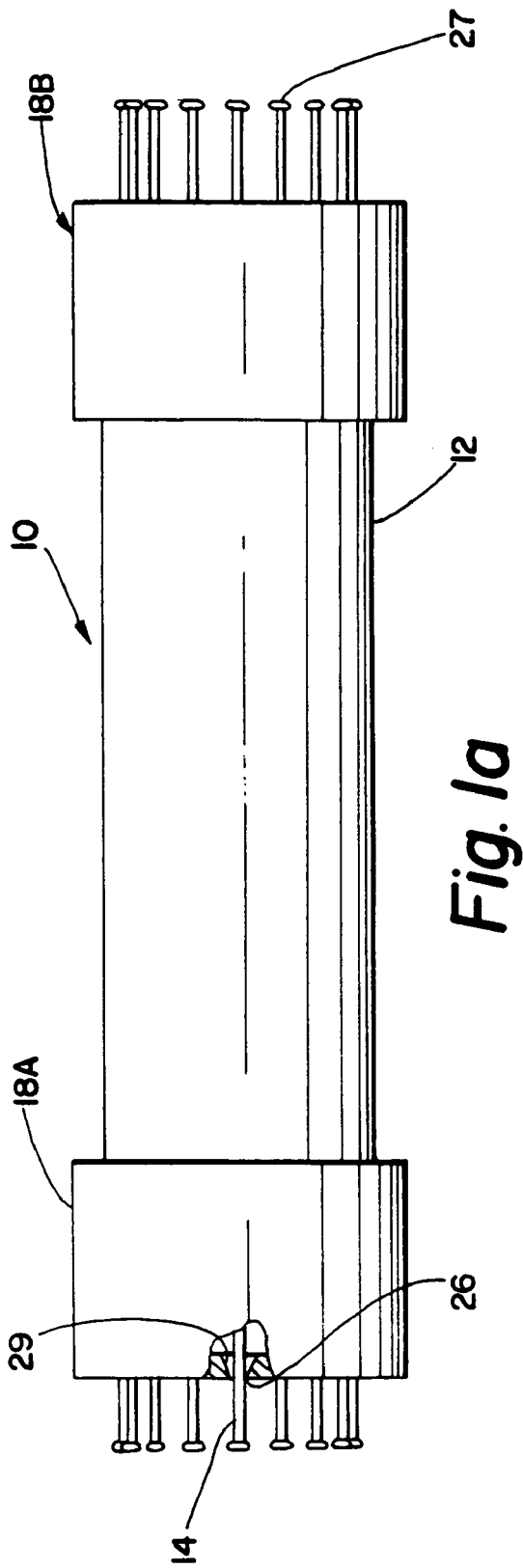
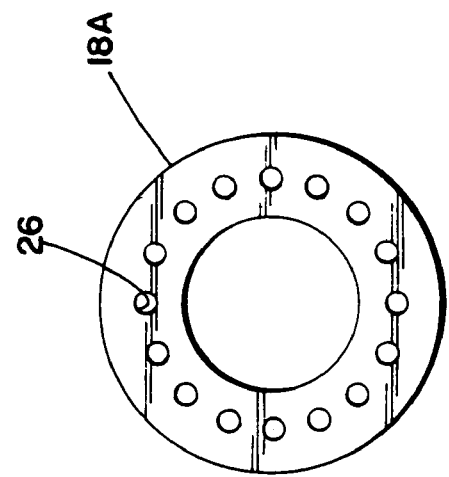
Fig. 1a
Fig. 1b

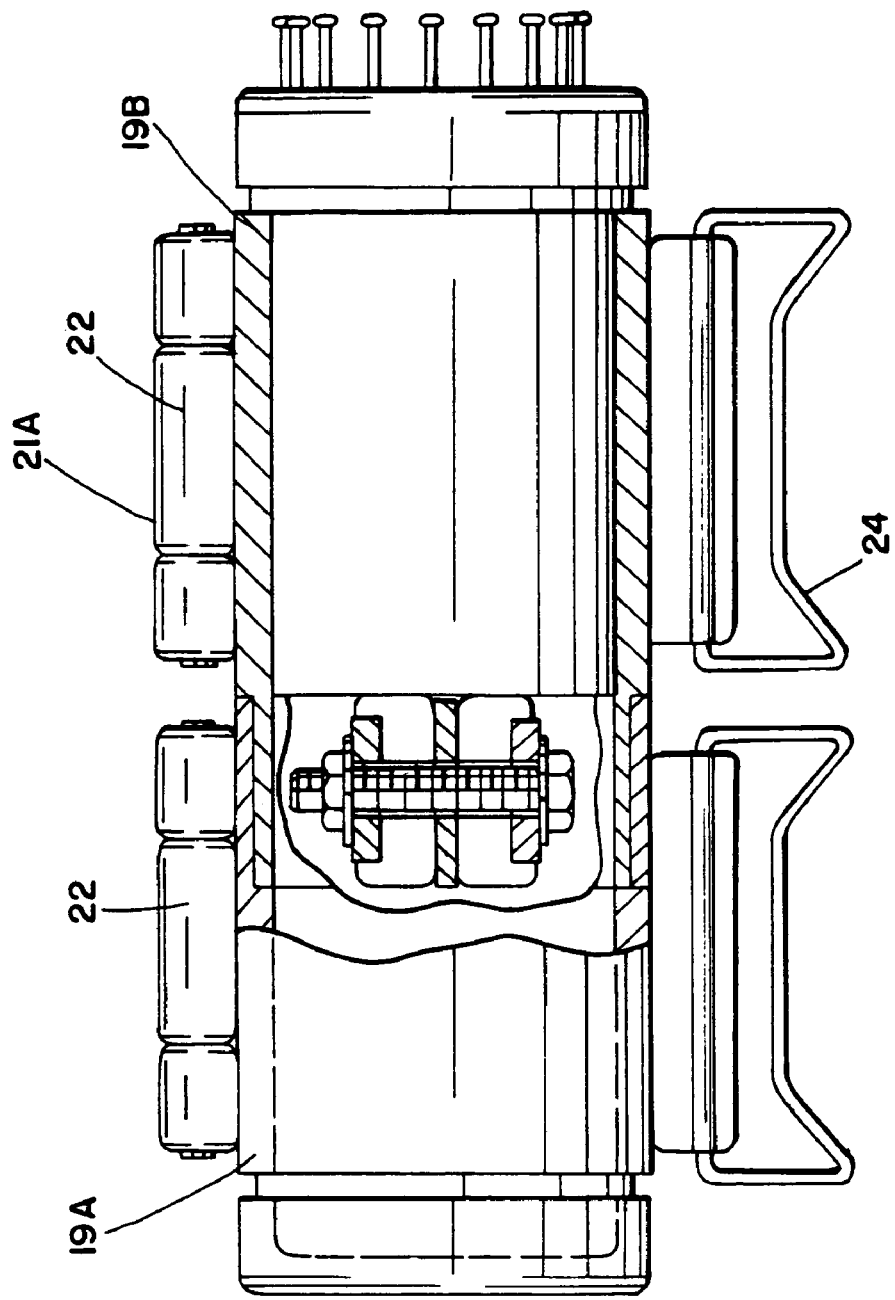

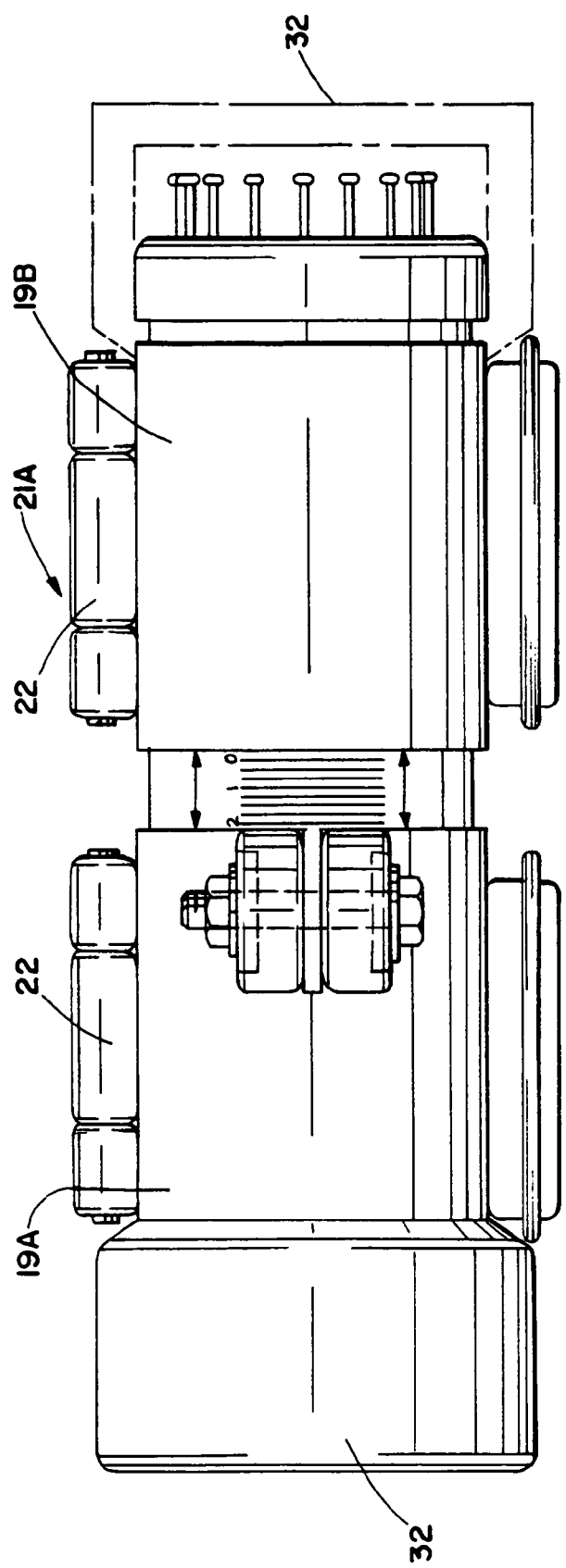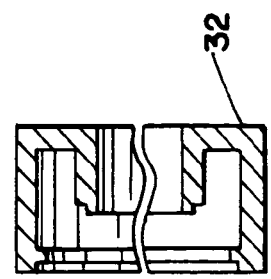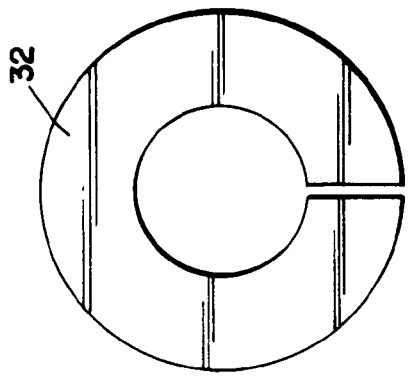
Fig. 4
Fig. 4b
Fig. 4a

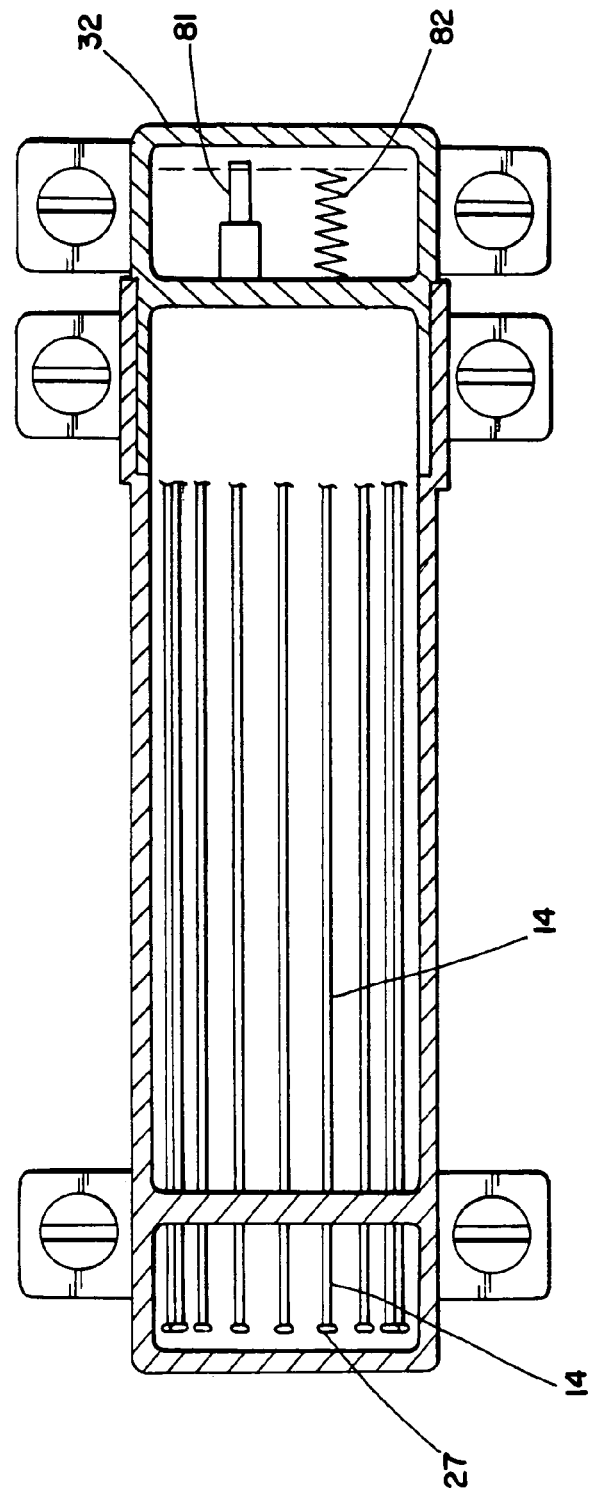

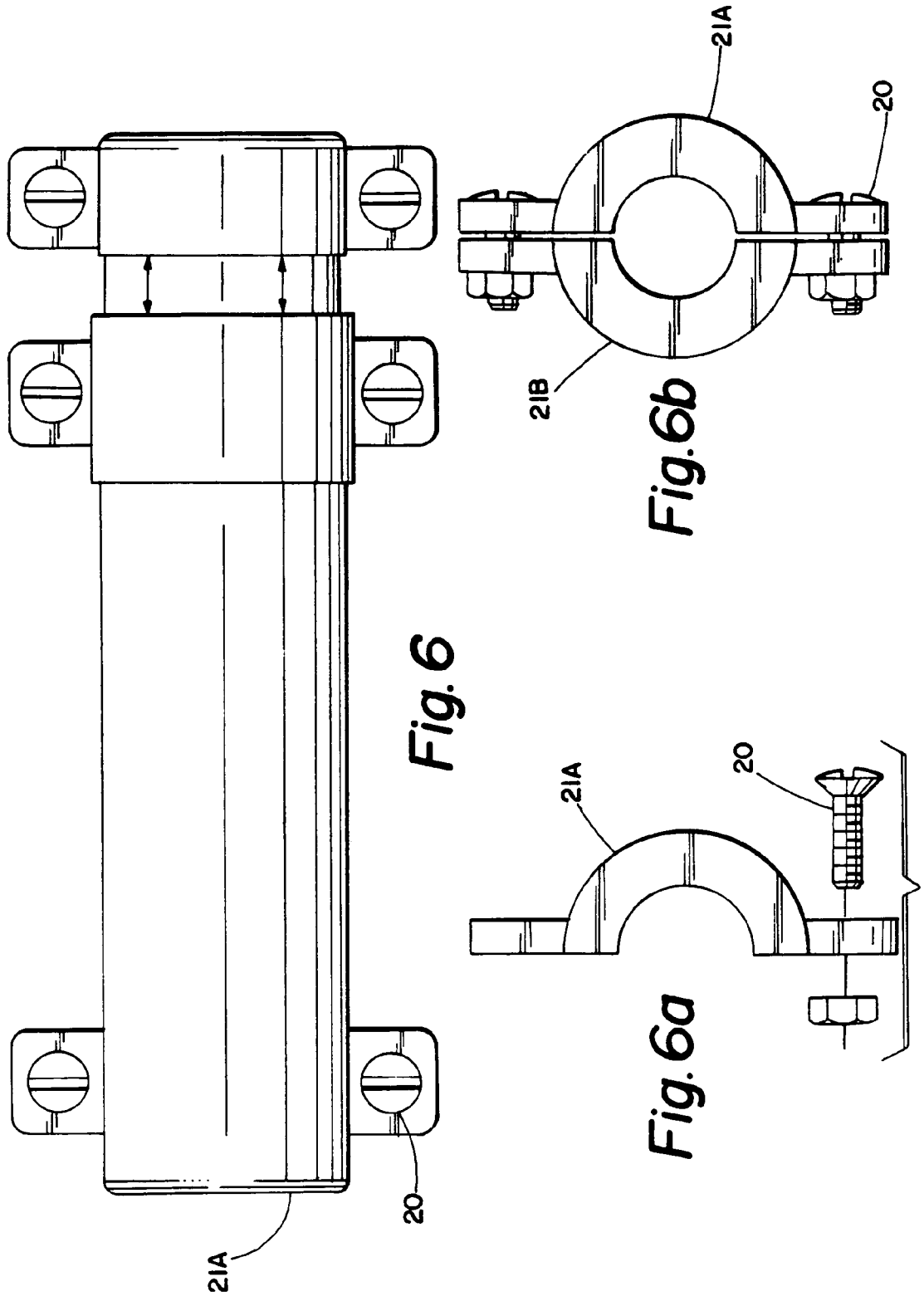

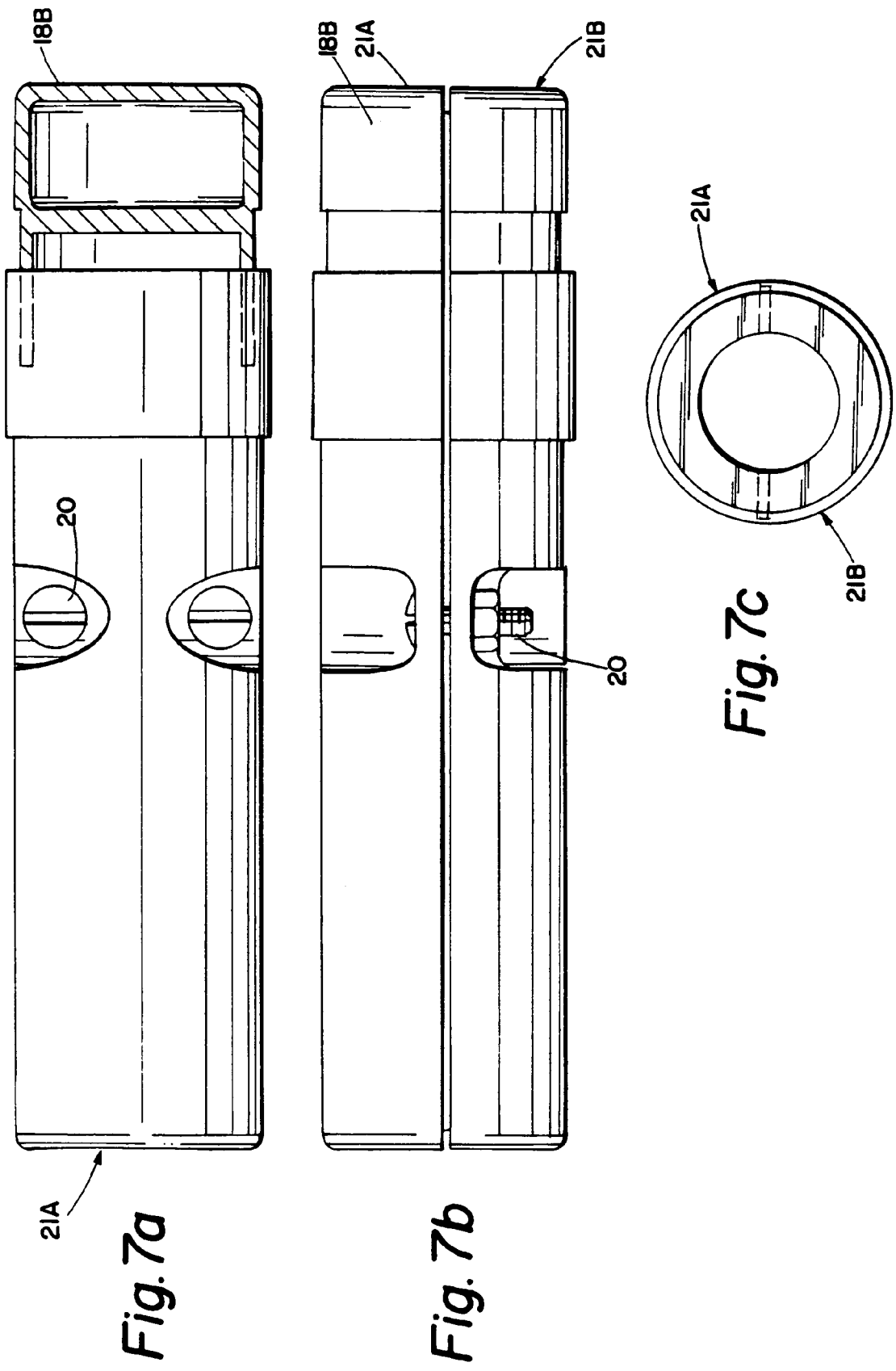

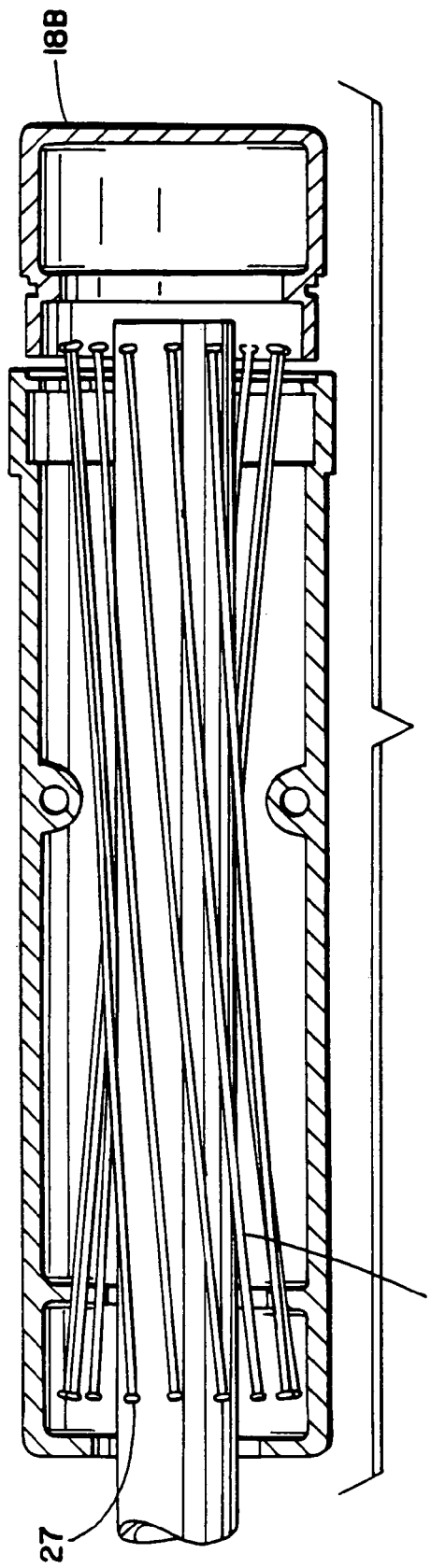
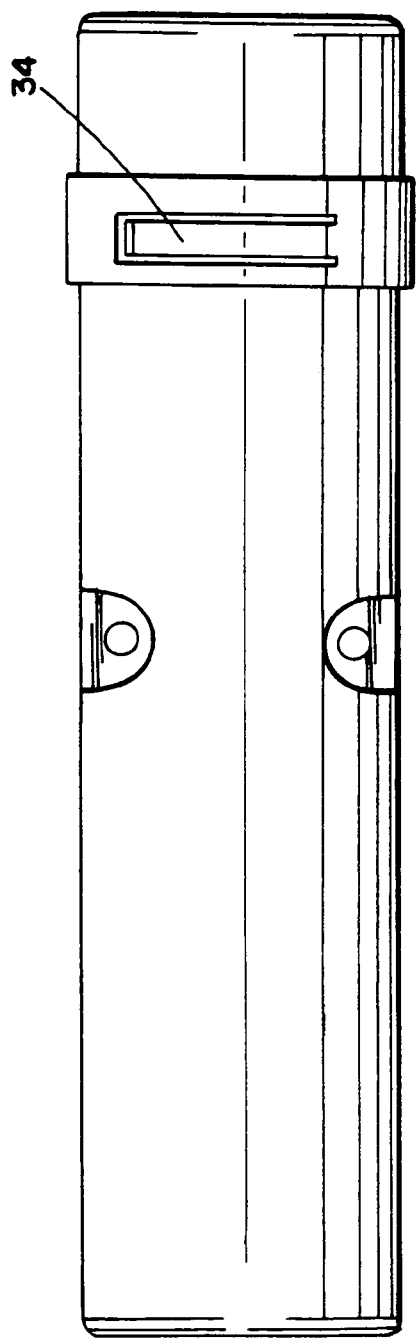
Fig.8a
Fig.8b

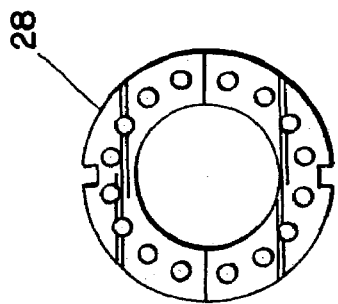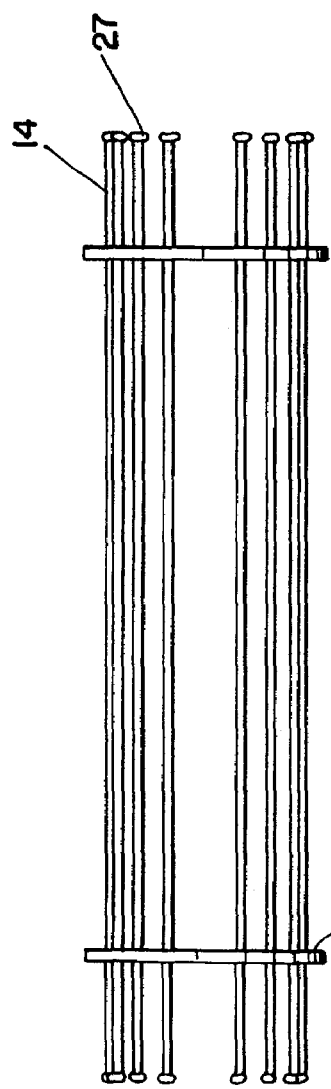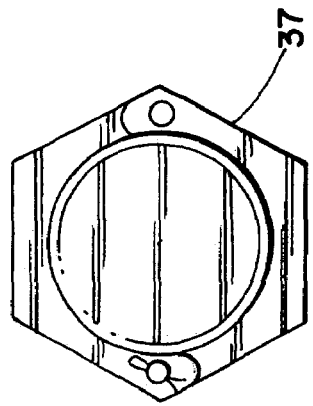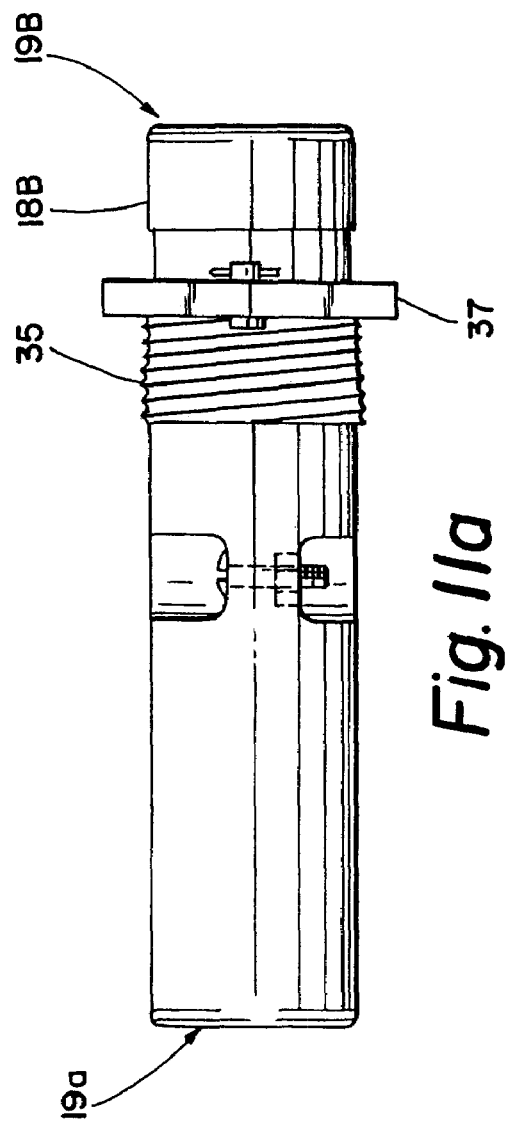

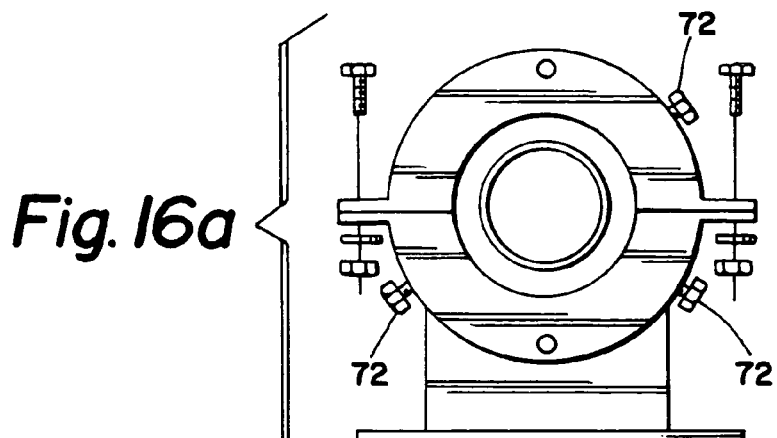
Fig. 16a
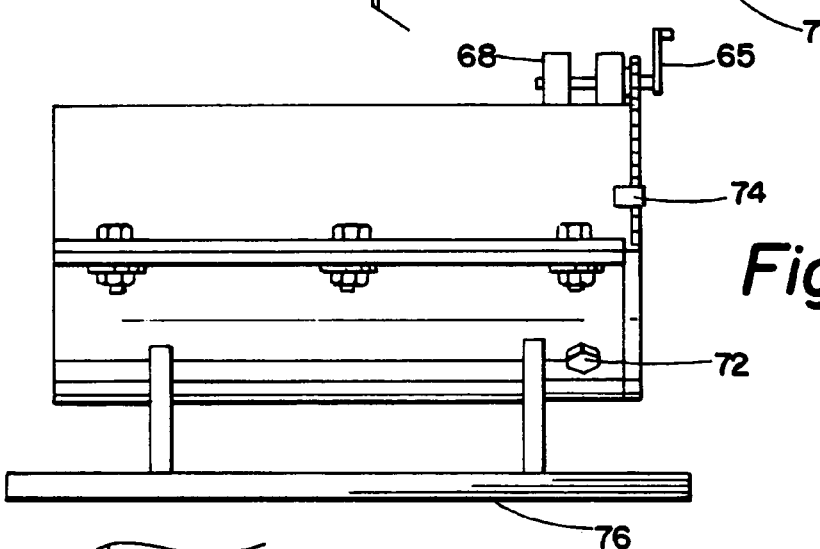
Fig. 16b
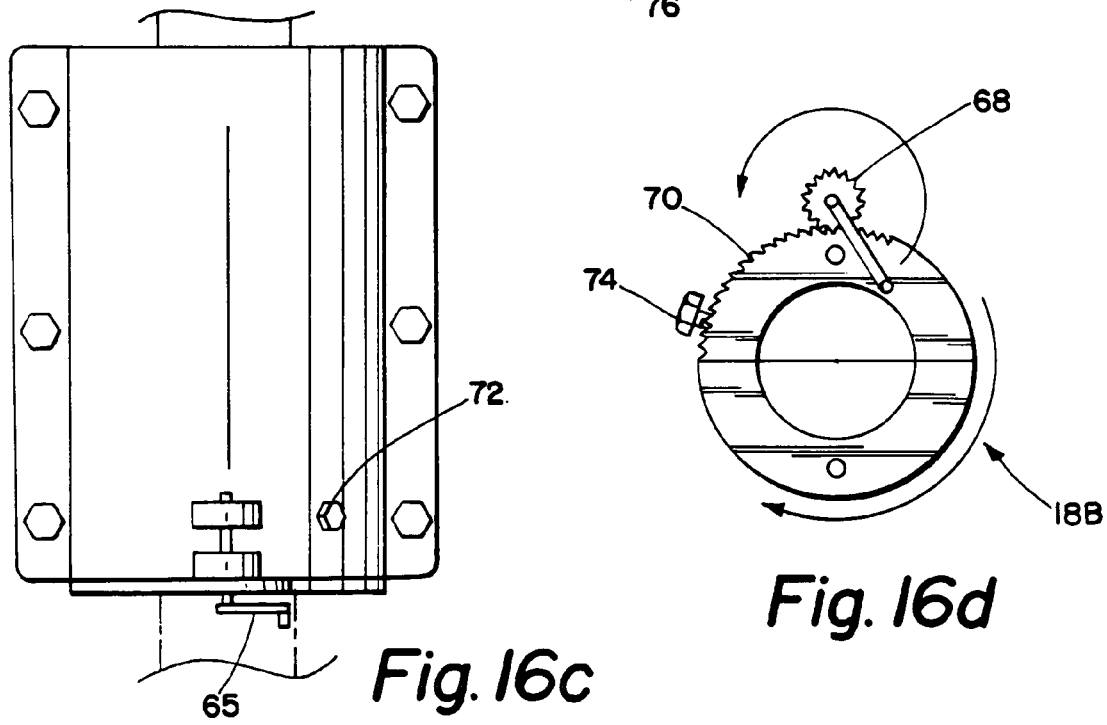
Fig. 16c
Fig. 16d

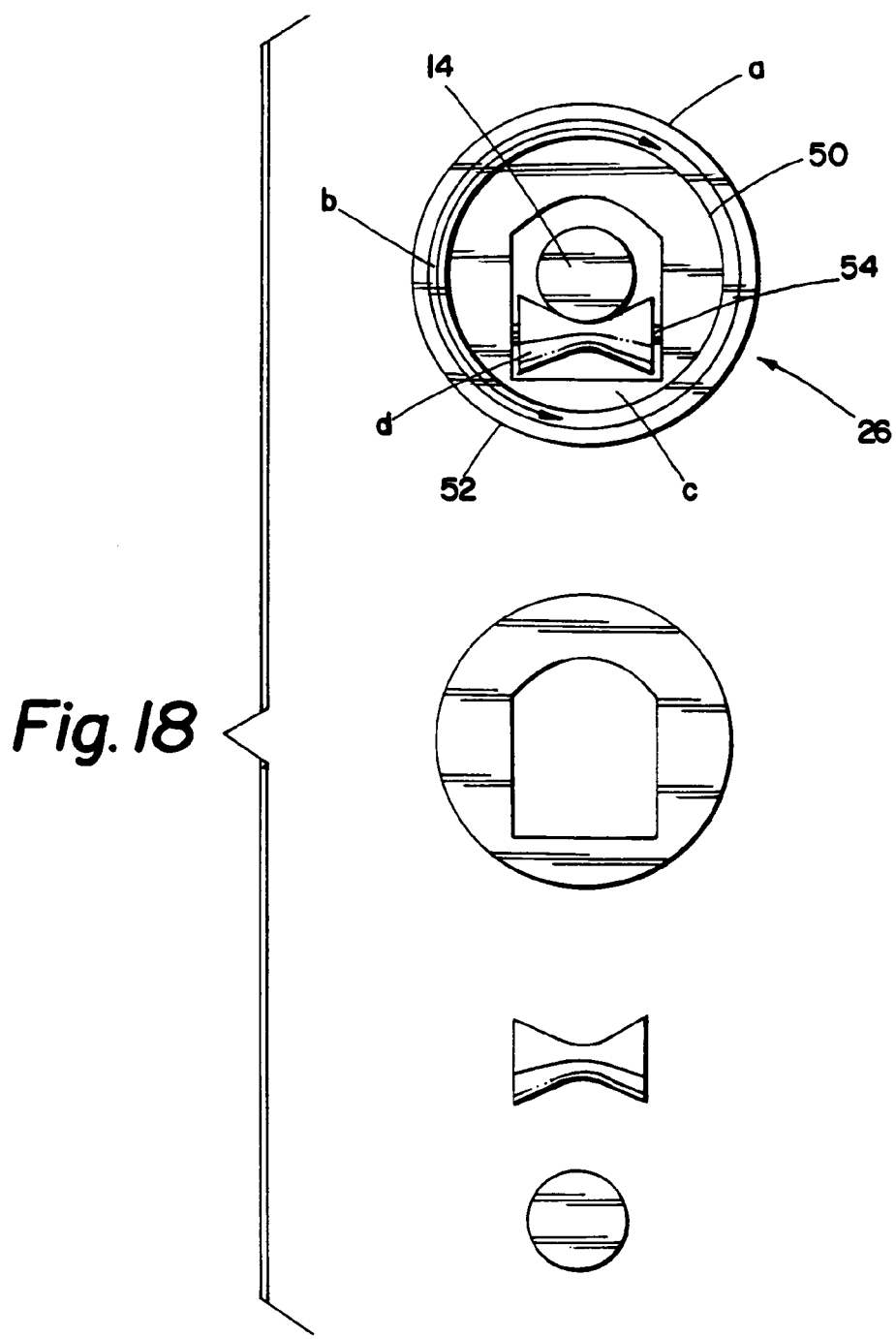

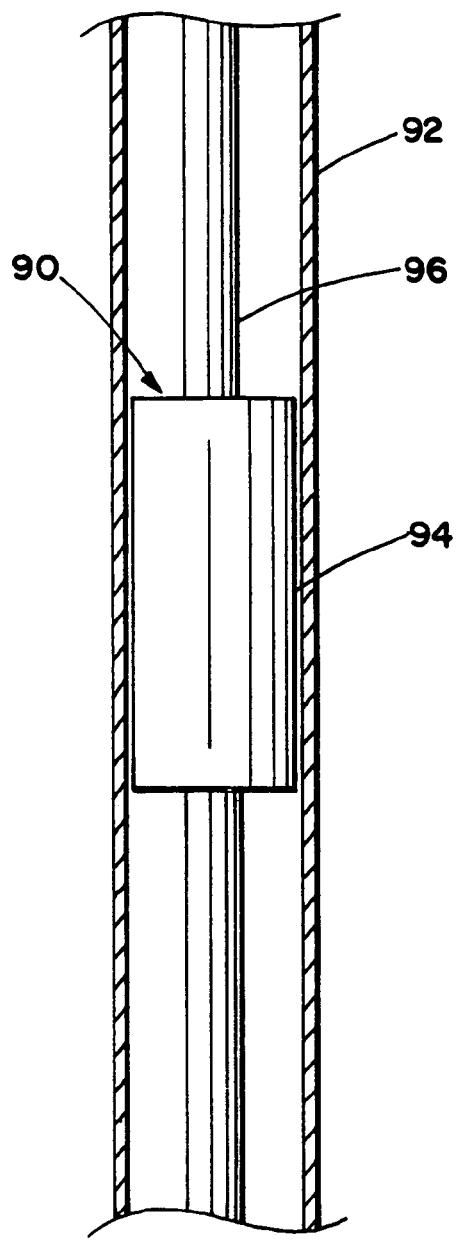
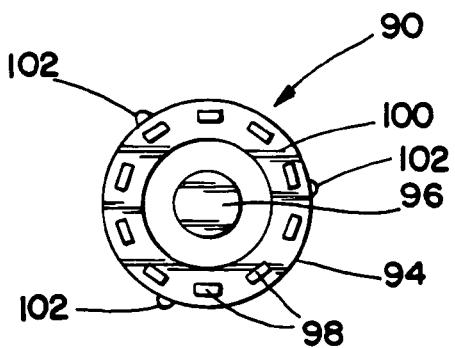
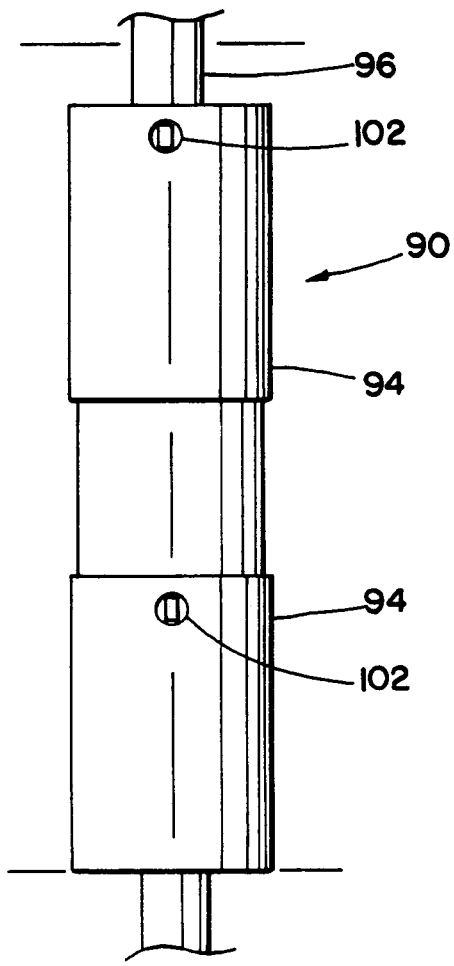
Fig. 21a
Fig. 21b
Fig. 21c

UNIVERSAL SUPPORT AND VIBRATION ISOLATOR

This application is a continuation of U.S. patent application Ser. No. 10/007,312, filed Nov. 10, 2001 now abandoned, which in turn claims priority under U.S. provisional patent application Ser. No. 60/247,290, filed Nov. 10, 2000.

BACKGROUND OF THE INVENTION

This invention relates to supports and, more specifically, to supports, clamps, mounting and positioning devices, protectors, and vibration isolators designed for pipes, motors, and other objects, including objects with solid cross-sections such as rotating drills and drive shafts.

Piping systems in buildings and commercial installations, such as factories, refineries, and chemical plants, are often anchored to the building structure. Such piping systems are subject to various forces that may cause movement or vibration in the pipes and damage the piping system or the anchors that hold the pipes. The noise generated by such vibration may be irritating to people within the building. Some of the events that cause movement in a piping system are earthquakes, temperature induced expansion and contraction, objects impacting the piping system, changes in the temperature, pressure, composition, turbulence or other flow conditions of the contents of the piping system, and rotations of the pipes or pipe connectors.

Other systems in building, commercial installations, and the like, also may be subject to forces that may cause unwanted or damaging movement or vibration of the systems. Conversely, if the systems include nonstatic elements, such as a rotating drill or drive shaft, the systems may themselves generate forces that cause unwanted or damaging movement or vibration of the structures that anchor or retain the systems in position.

SUMMARY OF THE INVENTION

In accordance with the present invention, a support is provided for securing pipes or other objects within the support and isolating shock and vibration generated or transmitted by the object or its environment. For convenience, the support and isolator of the present invention may be referred to as either a support or an isolator, without necessarily implying the absence of the feature not named.

The invention generally is described with reference to a specific embodiment comprising a pipe support, i.e., a support for a generally stationary object of hollow cross-section. However, as described further below, the invention is not limited to this embodiment. It is understood that the supported object may be solid in cross-section. The supported object may be capable of rotating or sliding within its support. The support itself may be capable of rotating or sliding relative to an enclosing structure. In some application, the support may be capable of rotating or sliding relative to an enclosure while the support is clamped securely to a rotating or sliding object.

In accordance with one aspect of the present invention, a support is provided that comprises a frame and a plurality of support members within the frame. The support includes means for supporting each of the plurality of members at a minimum of two contact points. The support also includes means for rotating each of the support members at a first contact point with respect to a second contact point so that the support members engage an object placed within the support.

In accordance with another aspect of the present invention, a support is provided that comprises a frame and a plurality of support members within the frame. The support includes means for supporting each of the plurality of members at a minimum of two contact points. The support also includes means for rotating each of the support members at a first contact point with respect to a second contact point so that the support members engage a bearing surface containing a rotating object placed within the support.

In accordance with another aspect of the invention, a support is provided that comprises a frame and a plurality of support members within the frame. The frame contains a bearing surface, wheels or other rotating slidable means on its outer surface so that it may rotate and slide within a outer circular confinement. The rotating, slidable means allows the frame both to rotate and slide within an outer support pipe. The support also includes means for rotating each of the support members at a first contact point with respect to a second contact point so that the support members engage a rotating object placed within the support.

In accordance with another aspect of the present invention, a pipe support is provided that includes a frame capable of being placed around an existing pipe and a plurality of support members within the frame. The pipe support includes means for supporting each of the plurality of members at a minimum of two contact points. The pipe support also includes means for rotating each of the support members at a first contact point with respect to a second contact point so that the support members engage a pipe placed within the pipe support.

In accordance with yet another aspect of the invention, a method of securing a pipe is provided. Using a pipe support in accordance with the present invention, the pipe support is placed around a pipe. Then, the means for rotating the support members are rotated to secure the pipe in the support members.

In accordance with yet a further aspect of the invention, a method of isolating vibration in a pipe is provided. Using a pipe support in accordance with the present invention, the pipe support is placed around a pipe. Then, the means for rotating the support members are rotated to secure the pipe such that any vibration occurring in or transmitted by the pipe is isolated by the plurality of support members.

The present invention offers numerous advantages. The support is easily attached to a pipe or other object and can be used to secure an object as well as isolate vibration occurring in or transmitted by the object. One or more supports may be used for a single object to ease of installation, reduce inventory, or accommodate the configuration of a supported object. The frequency response of the support may be adjusted to the particular vibration conditions associated with the object. The support allows for adjustment of the clamping pressure that the support holds the object with. The support also automatically centers an object when the support members are engaged. The orientation of an object may be adjusted with respect to the frame once the object is secured by the support, a feature that is not available in other supports. In addition, the support may secure a sliding or rotating object while the support independently slides or rotates within an enclosure.

Still other benefits and advantages of the invention will become apparent to those skilled in the art to which it pertains upon a reading and understanding of the following detailed specification.

BRIEF DESCRIPTION OF THE DRAWINGS

FIG. 1A is a side view of one embodiment of a pipe support in accordance with the present invention.

FIG. 1B is an end view of the exterior of a case end of the embodiment illustrated in FIG. 1.

FIG. 3 is a side view of the embodiment of FIG. 1G.

FIG. 4 is a top view of the embodiment of FIG. 1G illustrating a frequency calibration feature.

FIG. 4a is an end view of a flexible, split end cap shown in FIG. 4.

FIG. 4b is a side view of an alternative flexible end cap.

FIG. 5 is a cross section of an alternative embodiment having a different clamshell case construction.

FIG. 6 is a top view of the case of the embodiment of FIG. 5.

FIG. 6a is the end view of a section of the case of the embodiment of FIG. 5.

FIG. 6b is an end view showing the mating sections of the case of the embodiment of FIG. 5 fastened together.

FIG. 7a is a top view of a case of an alternative embodiment of the present invention.

FIG. 7b is a side view of the case of the embodiment of FIG. 7a.

FIG. 7c is an end view of the case of the embodiment of FIG. 7a.

FIG. 8a is a bottom cross sectional view of an alternative embodiment of the present invention.

FIG. 8b is a top view of the case of the embodiment of FIG. 8a.

FIG. 9a is a side cross sectional view of the right cap of the embodiment of FIG. 8a.

FIG. 9b is an end cross sectional view of the cap shown in FIG. 9a.

FIG. 10a is a side view of a portion of an alternative embodiment of the present invention using bearing inserts.

FIG. 10b is a front view of the bearing insert shown in FIG. 10.

FIG. 11a is a side view of the case of an alternative embodiment of the present invention using a clamshell case construction.

FIG. 11b is an end view of the securing nut of the case of the embodiment of FIG. 11a.

FIG. 14 is an enlarged side view of the bearing surface of the bearing disc shown in FIG. 12a.

FIG. 15b is a side view of the left portion of the case of the embodiment of FIG. 15a.

FIG. 15c is a side view of the right portion of the case of the embodiment of FIG. 15a.

FIG. 15d is a top cross sectional view of the embodiment of FIG. 15a.

FIG. 16a is an end view of an alternative embodiment of a pipe support according to the present invention suitable for large scale applications.

FIG. 16b is a side view of the case of the embodiment of FIG. 16a.

FIG. 16c is a top view of the case of the embodiment of FIG. 16a.

FIG. 16d is an end view of a portion of the embodiment of FIG. 16a showing means for rotating the support members.

FIG. 18 is a front view of a bearing point in accordance with the present invention shown with friction reducing bearing means.

FIG. 21a is a simplified view of an isolator of the present invention inside an enclosure.

FIG. 21b is a top view of an isolator of the present invention capable of rotating or sliding with an enclosure.

FIG. 21c is a side view of the isolator of FIG. 21b.

It should be understood that the appended drawings are not necessarily to scale, presenting a somewhat simplified representation of various preferred features illustrative of the basic principles of the invention.

DETAILED DESCRIPTION OF CERTAIN PREFERRED EMBODIMENTS

As illustrated in FIGS. 1A-20, a support 10 is provided for supporting pipes, clamping pipes, isolating pipes from the environment, and/or isolating shock and vibration from pipes. While the illustrated embodiments of the present invention are particularly adapted for use with pipes, it is noted that the present invention can be used with any other object or group of objects placed within the support 10, such as, for example, distribution means, electric cable, and motors or portions of motors. One or multiple supports 10 may be used to support an object, clamp an object, and/or isolate vibration associated with an object. It is understood that the object may be provided with bearing means so that it may rotate and that the support frame may be provided with rotating, slidable means so that it might itself rotate and slide within an enclosing structure. Other embodiments and design variations will be readily apparent to those skilled in the art given the benefit of this disclosure.

Figure 1C:
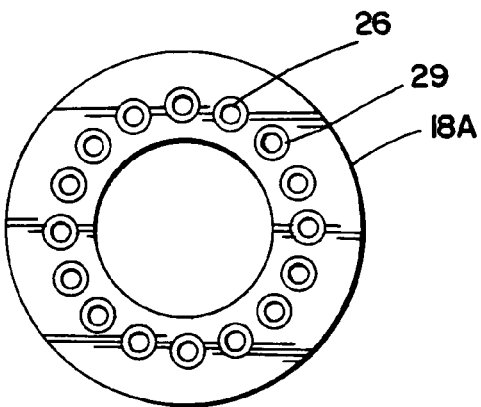
FIG. 1C is a end view of the embodiment illustrated in FIG. 1.
Figure 1D:
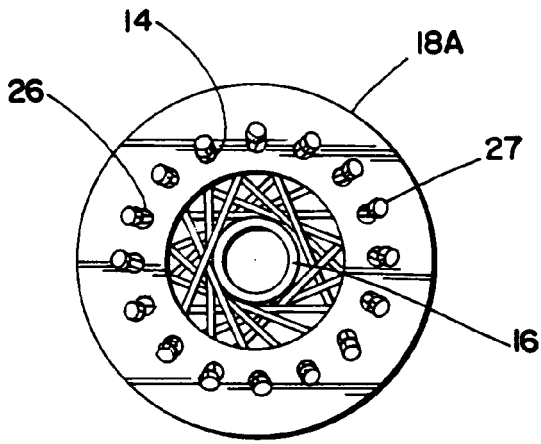
FIG. 1D is an end view of the embodiment illustrated in FIG. 1 shown with the support rods inserted through the case end and twisted into a support position.
Figure 1E:
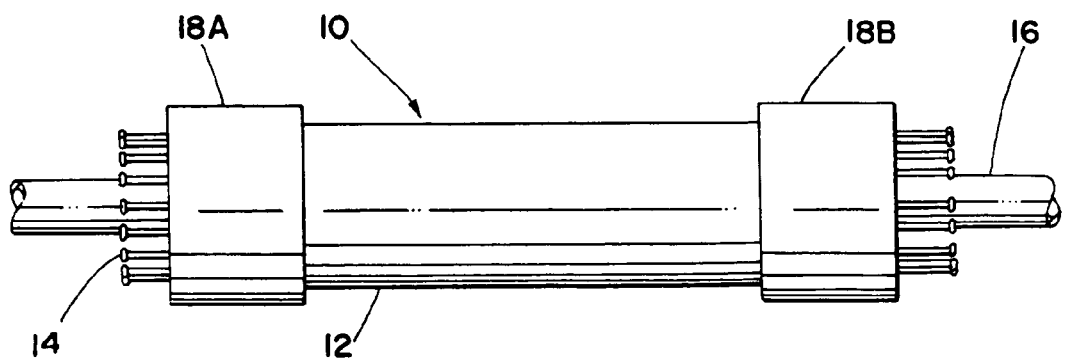
FIG. 1E is a side view of the embodiment of FIG. 1 shown with a pipe placed into the pipe support.

As illustrated in FIG. 1E, a pipe support 10 includes a frame or case 12 and support members 14. The case 12 is used to house the support members 14, and is placed around an object or group of objects, such as, for example, a pipe 16.

The case 12 is preferably a cylinder that can be placed around the longitudinal axis of a pipe 16. As shown in FIG. 1A, the case may comprise a left cap or end 18A and a right cap or end 18B, with at least one end 18A, 18B, being rotatable relative to the case 12 and the other end 18A, 18B. The case 12 also may be divided longitudinally into left and right portions 19A, 19B, as shown in FIGS. 3 and 4. One case portion 19A, 19B may be rotatable relative to the other portion 19A, 19B. Alternatively, the case portions 19A, 19B may be connectable in a fixed position relative to one another and a rotatable end 18A, 18B provided on one of the case portions 19A, 19B.

Figure 2A:
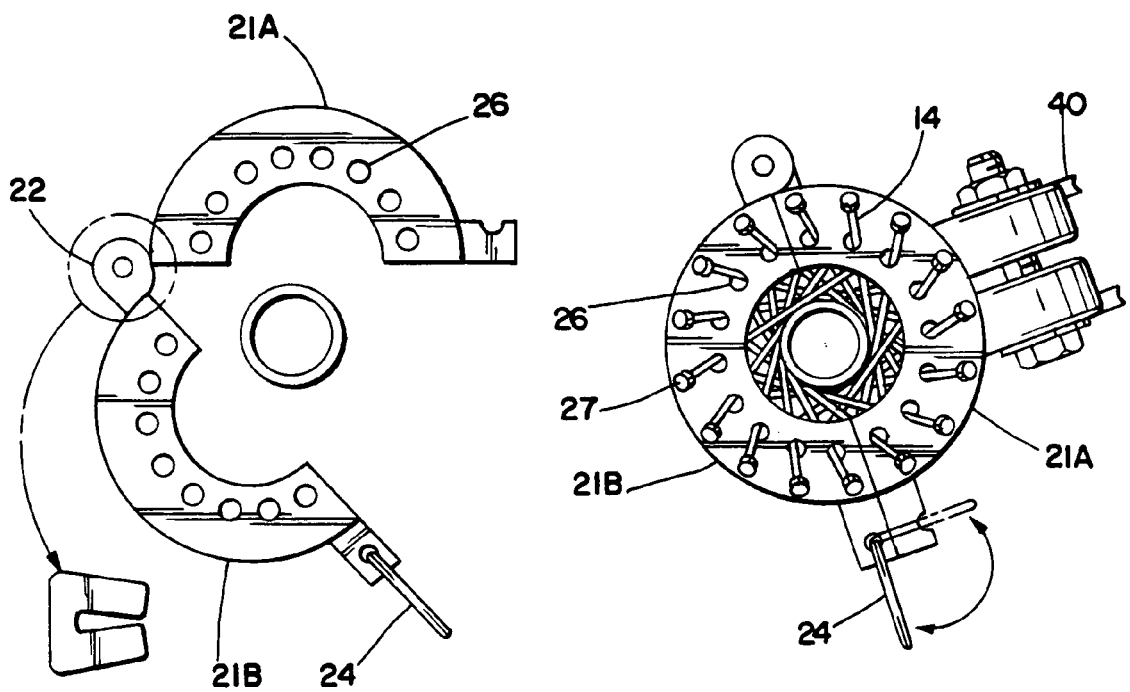
FIG. 2a is an end view of mating sections of a case end of the embodiment of FIG. 1G showing both halves of the clamshell case construction.

As shown in FIGS. 1G, 2a, 6, 6a, 6b, 7a, 7b, and 7c, the case 12 also may be divided laterally into upper 21A and lower 21B sections. As illustrated in FIGS. 2a, 2b, 6b and 7c, the sections 21A, 21B are preferably half-cylinders, but those skilled in the art will recognize that other shaped sections that are not equal halves or are not portions of a cylinder may be used in the present invention. When the case 12 is divided into upper 21A and lower 21B sections, the sections 21A, 21B may be secured by fastening the two half-cylinders together with fastening means such as screws or bolts 20 or a pipe clamp (not shown). As shown in FIG. 2a, such a case 12 may also be secured using hinges 22 and a fastener 24, which may be a snap clamp, pipe clamp, other quick fastener, bolt, or screw. FIGS. 11a and 11b shown the use of a split nut 37 to secure a case with continuous exterior threads 35 on the exterior of the case 12. Forming the case 12 from two sections 21A, 21B advantageously allows the pipe support 10 to be placed over an existing pipe 16 without any disassembly of the pipe structure. It also allows the pipe support 10 to be placed around a new pipe section without threading the pipe through the support.

Combinations of the above-described case configurations may be employed in the present invention. For example, the case may be divided into left and right portions 19A, 19B, each of which in turn is divided into upper and lower sections 21A, 21B, as shown, for example, in FIGS. 2c, 3 and 4. It will be recognized by those skilled in the art that other designs of the case 12, such as, for example, cases 12 having different geometries, can be used in the present invention.

In yet another alternative embodiment of the invention (not shown in the drawings), the case 12 may define a lateral slot or opening such that the case 12 does not completely enclose the object to be supported. For example, a half cylinder could be used as a case 12 in this embodiment and a pipe 16 could be placed on support members 14 connected to the case 12. In this embodiment, the support 10 would act as a support and a vibration isolator but, in some designs, may not function as a clamp. Cases having other configurations that partially enclose the object to be supported also are within the scope of the invention.

The support members 14 are preferably rods 14 that are placed within the case 12 and around the item, such as a pipe 16, to be supported. The cross section of the rods 14 may be round or may be any other shape, and the cross section of the rods 14 may be the same throughout a rod's length or may vary, such as in a tapered rod. In addition, the rods 14 may be straight, bent, or curved. The support members 14 are preferably solid, flexible rods made from metal or other suitable material, such as a polymer or composite. In one preferred embodiment, the support members 14 are formed from a pultruded composite, such as, for example, a pultruded fiberglass/polyester resin composite. If desired, the rods 14 may exhibit elastic properties.

As illustrated in FIG. 1B, the pipe support 10 preferably includes bearing points 26 at each end of the case 12. The bearing points 26 may be part of the case 12 or may be included on bearing inserts or rings 28 attached near each end of the case 12, as shown in FIG. 10a. The bearing inserts 28 may be secured within the case 12 by notches on the inserts 28 that engage grooves provided on the inner surface of the case 12, as shown in FIGS. 10a and 10b. The use of separate bearing inserts 28 allows a case 12 to be used with rods 14 of varying sizes or positions.

Figure 14:
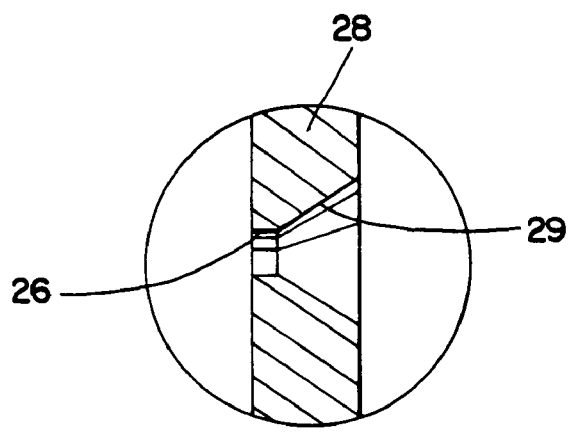

As illustrated in FIG. 14, a bearing surface 29 of the bearing points 26 may be flat, curved, concave, convex, or any other shape. The rods 14 engage the bearing surfaces 29 of the bearing points 26. FIG. 1A shows a bearing point 26 having a beveled bearing surface 29 to accommodate the movement of rods 14 resulting from rotation of a case end 18A, 18B, as shown in FIG. 1D.

In one preferred embodiment, the rods 14 are not restrained and are free to slide on the bearing points 26 as shown in FIG. 1D. The rods 14 may include end stops 27 so that the rods 14 cannot pass through the bearing points 26 of the case end 18A, 18B, as shown in FIG. 1C. The support rods 14 preferably are long enough that the ends of the rods 14 extend beyond the bearing points 26 when the rods 14 are twisted about the pipe 16 to clamp the pipe 16 and isolate vibration occurring in or transmitted by the pipe 16, as more fully discussed below. As shown in FIG. 5, the case 12 or ends 18A, 18B may include a restraining end or cap 32 to limit the linear movement of the rods 14 inside the case 12 between the bearing points 26. The restraining ends or caps 32 may be used in conjunction with the end stops 27 or as an alternative to the end stops 27. The end caps 32 may be integrally formed with the case ends 18A, 18B. To aid in installation, the end caps 32 may be formed from a flexible material, such as rubber, as shown in FIG. 4b. A flexible end cap 32 also may be split, as shown in FIG. 4a, to allow the cap 32 to be installed on an existing pipe. Other means to restrict the lateral movement of the rods 14, such as, for example, a hydraulic stop 81 or a spring stop 82, may also be used with the present invention. In addition to restricting the lateral movement of the rods 14, the end caps 32 may protect the rod ends from mechanical damage or prevent other objects from catching or collecting on the rod ends during use.

In an alternative embodiment, the support members 14 may be elastic members that are attached to the case 12 or to the bearing points 26 in a fixed position (not shown in the drawings). When first ends of such elastic support members 14 are rotated with respect to second ends, as more fully discussed below, the elastic support members 14 stretch to contact and grip the object placed between them. It will be recognized by those skilled in the art that other materials may also be used for the material of the support members 14.

Figure 19:
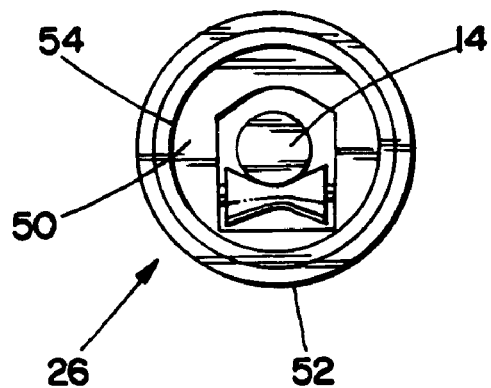
FIG. 19 is a front view of the bearing point of FIG. 18.
Figure 20:
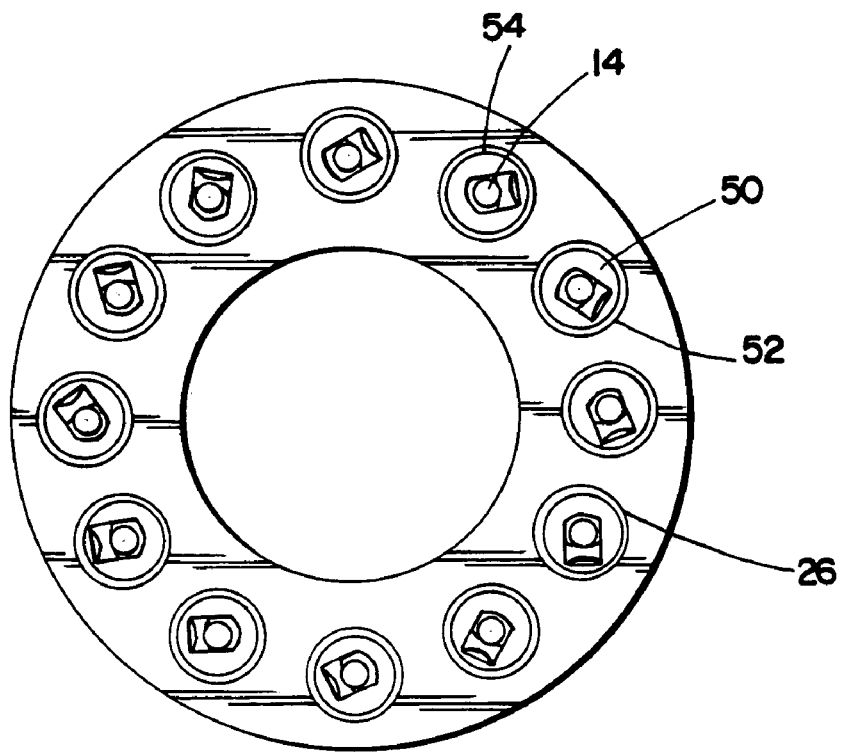
FIG. 20 is a front view of an end cap or bearing insert with bearing points as illustrated in FIG. 18.

The bearing points 26 may include friction reducing means such as, for example, ball bearings, roller bearings, or lubricant fittings. FIGS. 18-20 illustrate a bearing point 26 having friction reducing means that comprise an inner piece 50 rotatably connected about a first axis to an outer piece 52 that is attached to the case 12 or a bearing insert 28. A third piece 54 is rotatably connected to the inner piece 50 about a second axis that is substantially parallel to the first axis. A support member 14 is connected to the third piece 54 so that the support member 14 is rotatable in all directions with respect to the case 12. This allows the support members 14 to be rotated about a pipe 16 without producing friction in the bearing points 26.

Figure 1F:
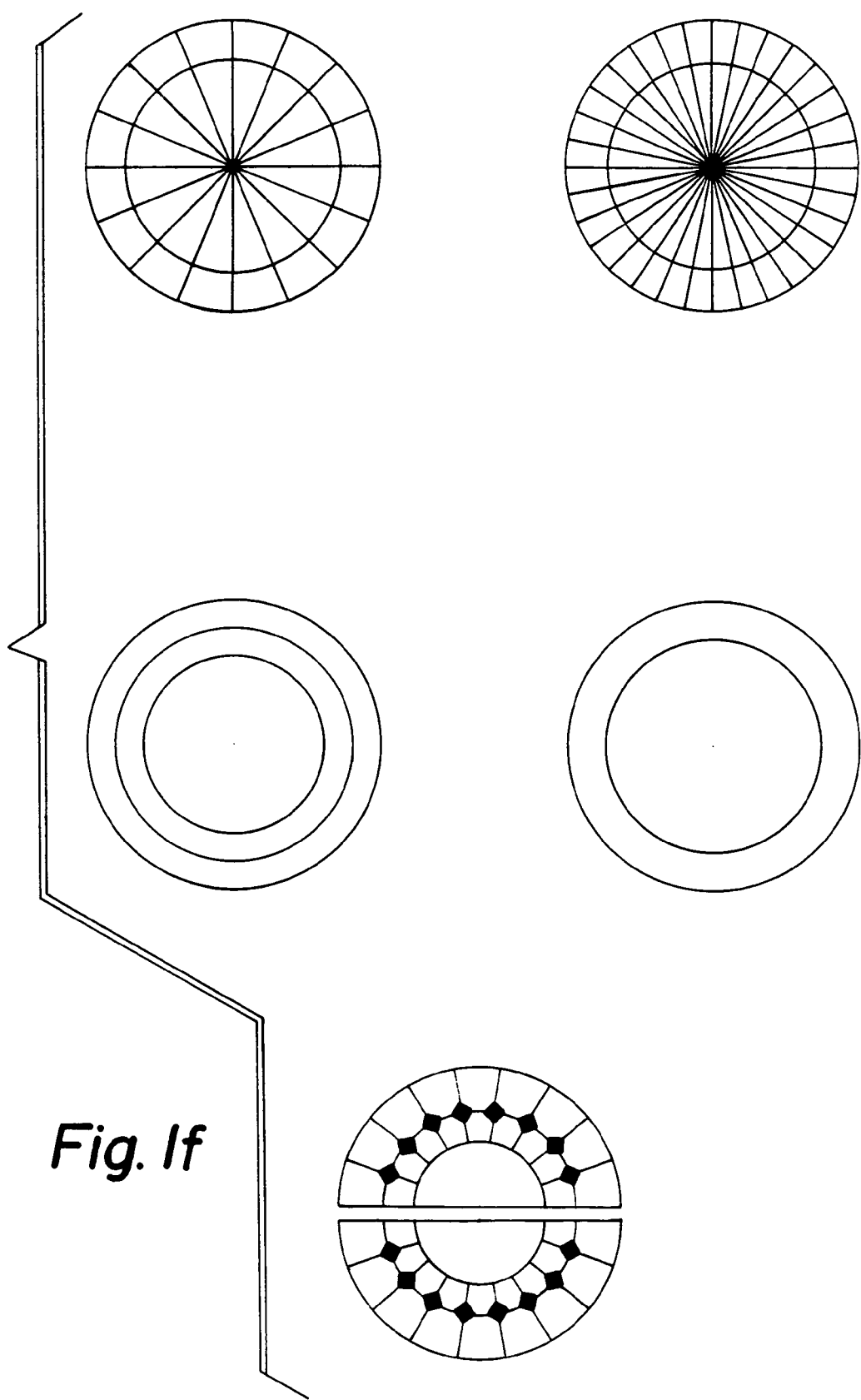
FIG. 1F illustrates the angles between the bearing points and the center of the pipe support in various embodiments having different numbers of support rods, an embodiment having concentric rings, and an embodiment using a clamshell design.
Figure 1G:
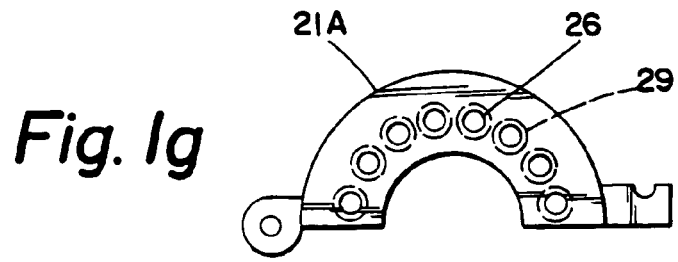
FIG. 1G is an end view of a section of a case end of another embodiment of the invention using a clamshell case construction.
Figure 17A:
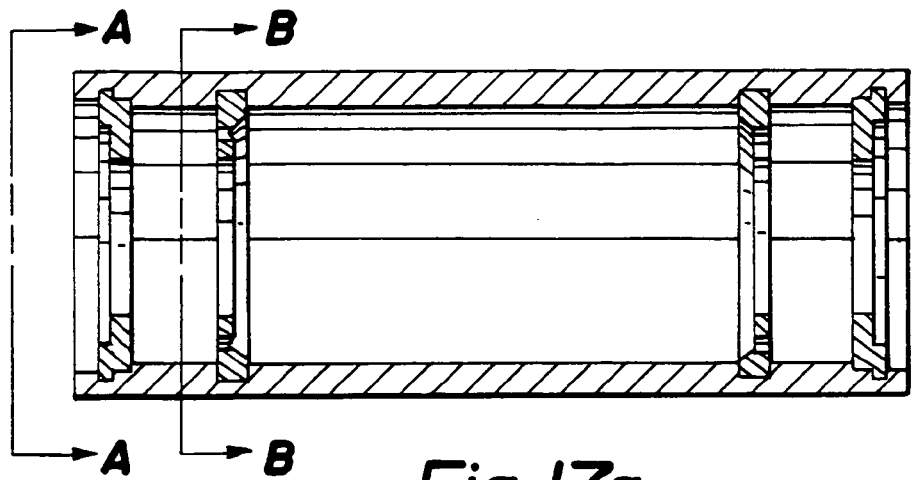
FIG. 17a is a side view of a portion of an alternative embodiment of the present invention shown with a bearing insert and a retainer plate.
Figure 17B:
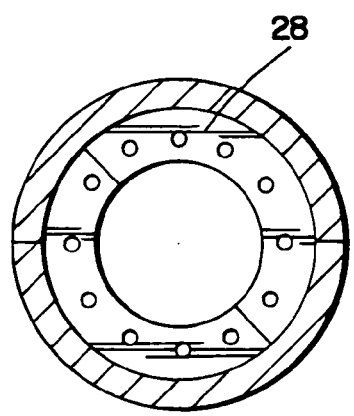
FIG. 17b is a view taken along line B-B of FIG. 17a showing the bearing insert.

Numerous variations of the arrangement and the number of the support members or rods 14 and corresponding bearing points 26 may be used in the present invention. As shown in FIGS. 12a, 12b, 13a, and 13b illustrating alternative embodiments, the bearing points 26 could be positioned symmetrically or asymmetrically, could be positioned in multiple rings, or could be positioned as points in other geometric patterns. FIG. 1F shows the angles between the bearing points 26 and the center of the case 12 in various embodiments. The bearing points 26 could be placed in bearing inserts 28 or directly in the case 12. The shape of the case 12 may also be varied to correspond with the shape of the bearing points 26 or bearing inserts 28. As shown in FIGS. 17a and 17b, when a case 12 comprising two halves is used, a bearing insert 28 may also be divided into two halves in order to allow the pipe support 10 to be placed around a pipe 16 without disassembling or cutting the pipe 16.

When first ends of the support members 14 are rotated with respect to second ends of the support members 14, the support members 14 will engage the pipe 16 or any other object or group of objects that is between them. The case 12 may comprise a right end 18B or portion 19B that is rotatable with respect to a left portion 19A. As the right end 18B or portion 19B is rotated, the bearing points 26 within the right end 18B or portion 19B are rotated with respect to the bearing points 26 within the left portion 19A. This rotation of the bearing points 26 rotates one end of each support member 14 with respect to the other end so that the support members 14 will contact an object in between them.

Figure 17C:
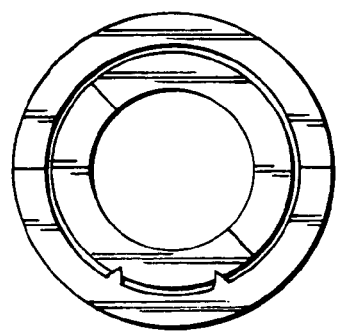
FIG. 17c is a view taken along line A-A of FIG. 17a showing the retainer plate.

It will be recognized by those skilled in the art that other means for rotating the support members 14 are also included in the invention. For example, FIGS. 17a-17c illustrate an alternative embodiment of the invention using a bearing insert 28 that may be rotated with the use of a key (not shown) designed to fit into a keyhole 5 of the bearing insert 28 so that the bearing points 26 in the bearing insert 28 (and therefore the support members 14 held by the bearing points 26) are rotatable. As shown in FIGS. 8a, 8b, 9b, 9c, and 9e, the case 12 may include a right end 18B (shown in FIGS. 8a and 9a) provided with teeth 32 that interlock with a ratchet clip 34 on the inside of the case 12 to secure the rotational position of the right end 18B of the case 12 with respect to the left end 18A of the case 12. The spacing of the teeth 32 may be calibrated to provide preset intervals for rotational tensioning. It will also be recognized by those skilled in the art that other means for securing the rotational position of one end or portion of the case 12 with respect to the other are included in the present invention.

As shown in FIG. 1E, when straight support members 14 are used, the support members 14 preferably define an initial position that is substantially parallel to the pipe 16. As the bearing points 26 at one end of the case 12 are rotated with respect to the bearing points 26 at the other end of the case 12, first ends of the support members 14 rotate with respect to second ends of the support members 14 so that the support members 14 will contact an object within the support members 14. The length of a support member 14 in between two bearing points 26 increases as a bearing point 26 at one end of the case 12 rotates with respect to a bearing point 26 at the other end of the case 12. When the support members 14 are rods 14 as shown in FIG. 1E, the ends of the rods 14 move closer to the bearing points 26 as the rods 14 are rotated. When the support members 14 are elastic members 14 connected to the bearing points 26, the elastic members 14 stretch as they are rotated about an object.

It is noted that when rods 14 are used, the rods 14 have a nonlinear response to the force applied to bend the rods 14 as the length of the rods 14 supported in between the bearing points 26 is increased. Less force is needed to bend the rods 14 as the length of the rods 14 bent through the bearing points 26 is increased. This is in contrast to the linear response from a spring, where the force required to depress the spring per unit distance is constant.

As illustrated in FIG. 1D, the support members 14 contact the pipe 16 to achieve a support position where the support members 14 act as a cradle for the pipe 16. The amount the support members 14 are rotated, which is preferably adjustable, will determine how tightly the pipe 16 is held between the support members 14. Once the pipe 16 is secured in the support members 14 of the support 10, the pipe support 10 acts as a clamp, gripping and securing the pipe 16. The pipe support 10 also may act as a vibration isolator to isolate any vibrations or shocks that the pipe 16 may receive or transmit. The case 12 of the pipe support 10 may also act to protect and insulate the pipe 16 from elements outside of the case 12.

When the first ends of the support members 14 are rotated with respect to the second ends of the support members 14, the support members 14 contact an object in between them and, depending upon the composition of the support members 14 in a specific embodiment and the amount that the support members 14 are rotated, the support members 14 may bend about the object as the support members 14 are rotated. When a symmetrical object such as a pipe 16 is engaged by the support 10, the area of each support member 14 contacting the pipe 16 will be substantially similar. The support members 14 will preferably contact the pipe 16 so that the longitudinal axis of the pipe 16 can be pivoted with respect to the longitudinal axis of the case 12. The support members 14 will also preferably contact the pipe 16 in a way that allows the pipe 16 to be rotated about its longitudinal axis while also providing resistance against lateral movement of the pipe 16. These advantageous features allow the pipe support 10 to support the pipe 16 and provide vibration isolation to the pipe 16 when the longitudinal axes of the case 12 and the pipe 16 are not parallel. These advantageous features also allow for some movement or adjustment of the pipe 16 after the pipe 16 is engaged by the support 10.

Figure 9A:
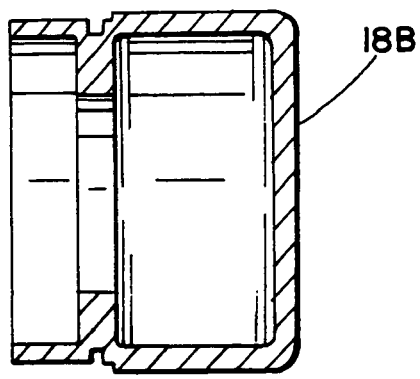
Figure 9B:
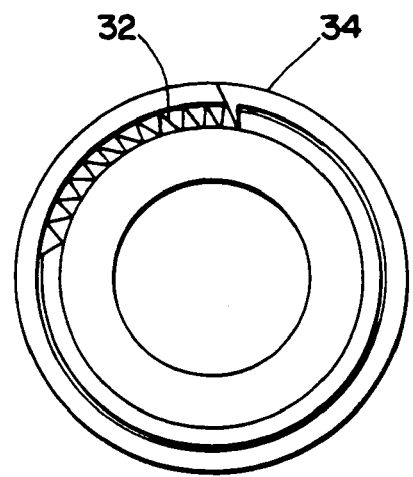
Figure 9C:
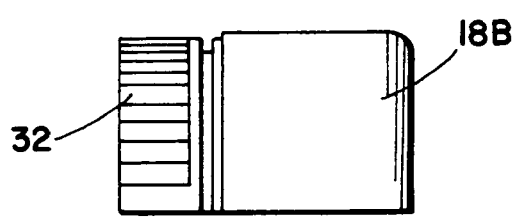
FIG. 9c is a top view of a portion of the cap of FIG. 9a shown with the teeth on the cap.
Figure 9D:
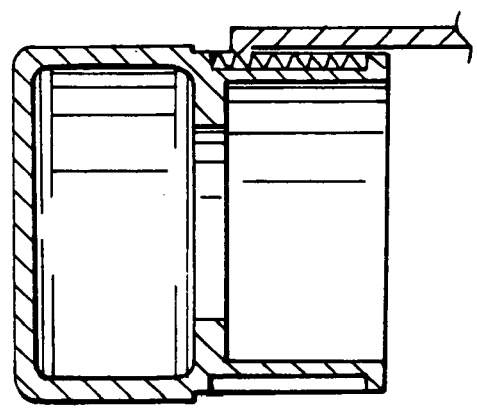
FIG. 9d is a side cross sectional view of an alternative embodiment of the present invention illustrating a frequency adjustment mechanism.
Figure 9E:
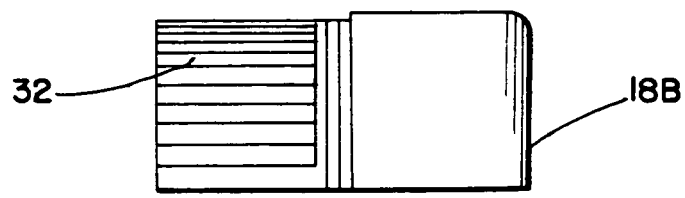
FIG. 9e is a side view of an alternative end cap allowing for frequency adjustment.
Figure 12A:
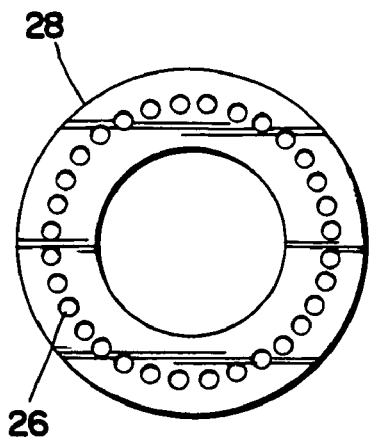
FIG. 12a is a front view of a bearing disc in accordance with the present invention.
Figure 12B:
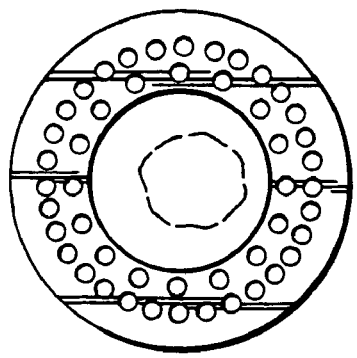
FIG. 12b is a front view of an alternative embodiment of a bearing disc in accordance with the present invention.
Figure 13A:
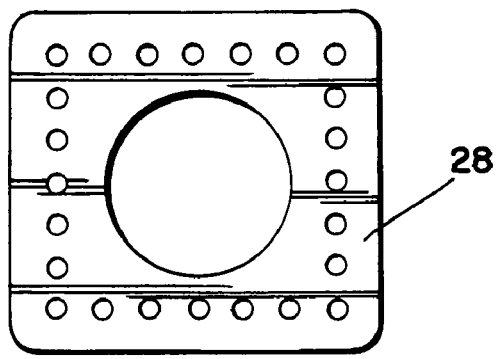
FIG. 13a is a front view of an alternative embodiment of a bearing insert in accordance with the present invention.
Figure 13B:
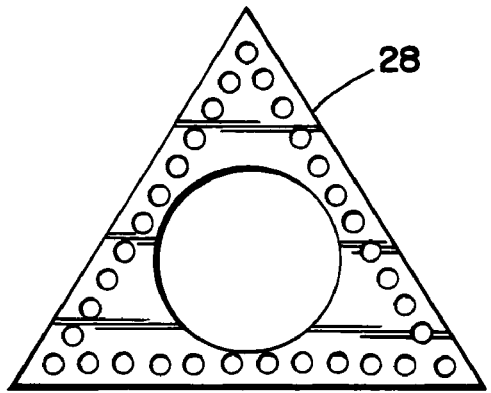
FIG. 13b is a front view of an alternative embodiment of a bearing insert in accordance with the present invention.

The pipe support 10 may also include means 36 for adjusting the frequency response of the support members 14 to vibration generated or transmitted by the pipe 16 when vibration is isolated by the support members 14. As shown in FIGS. 2c and 3, means 36 for adjusting the frequency response of the support members 14 may comprise a case 12 that has a right portion 19B that is slidable within a left portion 19A so that the distance between the bearing points 26 may be changed. As shown in FIG. 4, the inner portion 19B may be provided with graduated markings calibrated to particular frequency adjustment intervals or presets. Alternatively, as shown in FIG. 9d, an end cap 32 and case 18B may be provided with a ratchet slide clip that provides adjustment of the frequency response by moving the end cap relative to the case to change the distance between the bearing points 26. Another means 36 to adjust the frequency response of the support members 14 is illustrated in FIGS. 11a and 11b. The alternative embodiment includes threads 35 on outside of the left portion 19A and a hinged, split nut 37 adjustably clamping the right portion 19B within the left portion 19A so that the distance between the bearing points 26 is adjustable. Given the benefit of this disclosure, those skilled in the art will recognize that other means 36 for adjusting the frequency response of the support members 14 to vibration generated or transmitted by the pipe 16 are also included in the invention.

Figure 2B:
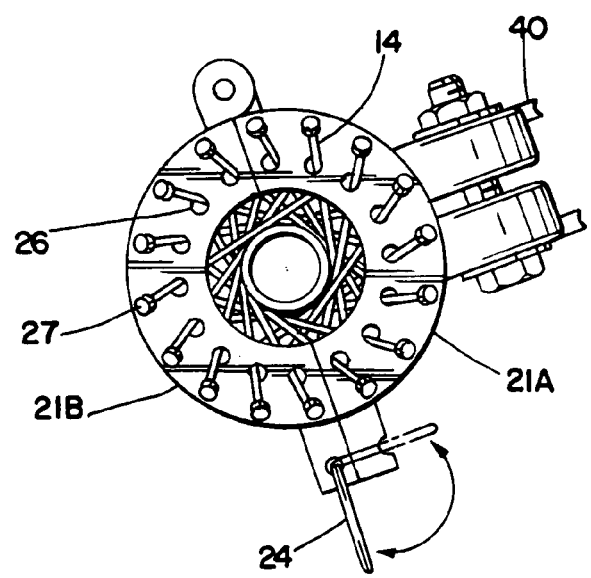
FIG. 2b is an end view of the embodiment of FIG. 1G shown with the case end sections fastened together and support rods and a pipe held therein.
Figure 2C:
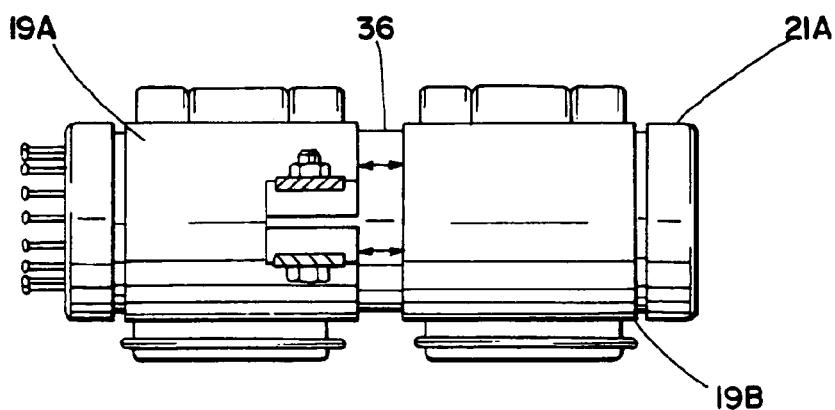
FIG. 2c is a top view showing right and left case portions of the embodiment of FIG. 1G.

As illustrated in FIG. 2b, the pipe support 10 may further include a hanger 40 attached to the case 12 to attach the pipe support 10 at a fixed point to another object. The hanger 40 may be any connector used to attach the case 12 to another object, such as, for example, clamp brackets, bolts, screws, wires or straps.

In an alternative embodiment of the invention (not shown in the drawings), the support members 14 are inserted into the bearing points 26 after the case 12 is placed around an object so that there is no need to rotate the bearing points 26 or support members 14. In this embodiment, the individual support members 14 contact the pipe 16 when they are inserted through two bearing points 26 on opposite sides of the case 12.

FIG. 21a shows another embodiment of the invention in which the isolator 90 is itself capable of rotating or sliding within a generally cylindrical enclosure 92, such as a pipe. FIG. 21a is a top view of the isolator 90 including includes a frame 94 capable of being secured to a rotating object 96 and a plurality of support members 98 within the frame 94. The isolator 90 also includes means 100 for supporting each of the plurality of support members 98 at a minimum of two points and rotating each of the support members 98 at a first contact point with respect to a second contact point so the support members engage an object 96 placed within the frame 94. Contact means 102 are attached to an outer surface of the frame 94 to allow the frame 94 to rotate and slide within the enclosure 92. The contact means 102 may be bearings, casters, wheels, or other suitable structures that engage the interior diameter of the enclosure 92 in a way that allows the frame 94 to rotate or slide relative to the enclosure 92. Alternatively, the enclosure 92 may be provided with an interior bearing sleeve, not shown in the drawings, that slidably engages the exterior of the frame 94.

Figure 15A:
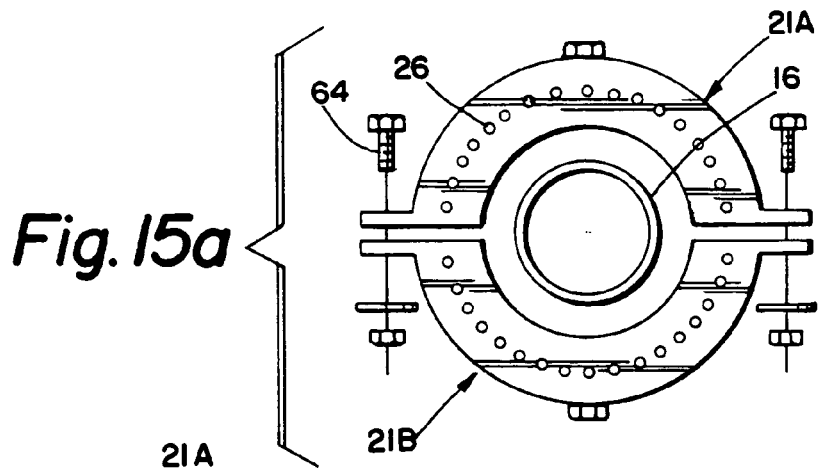
FIG. 15a is an end view of an alternative embodiment of a pipe support according to the present invention suitable for large scale applications.
Figure 15B:
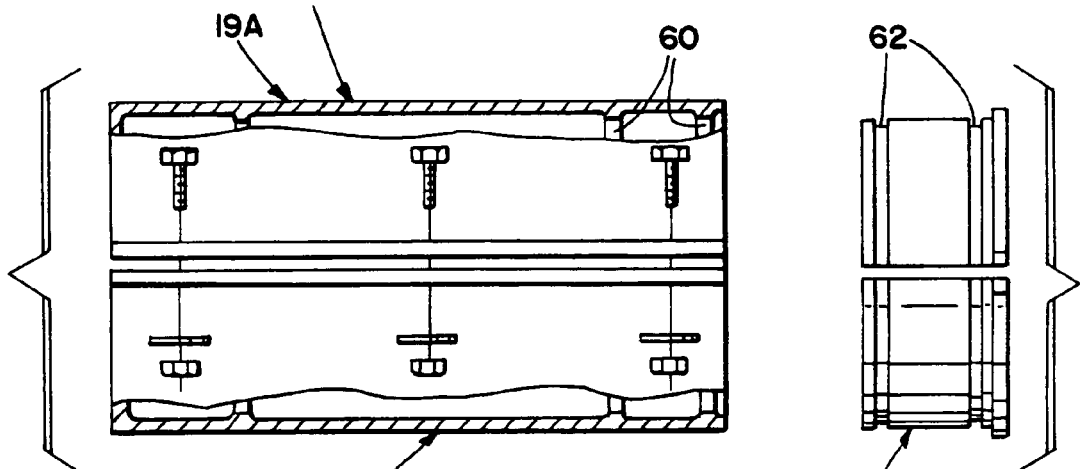
Figure 15C:
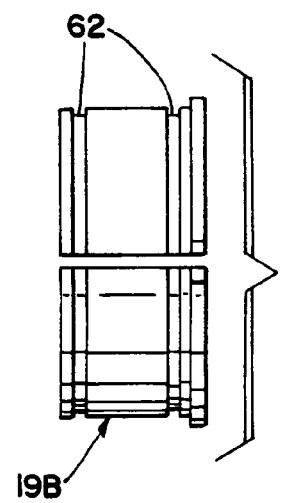
Figure 15D:
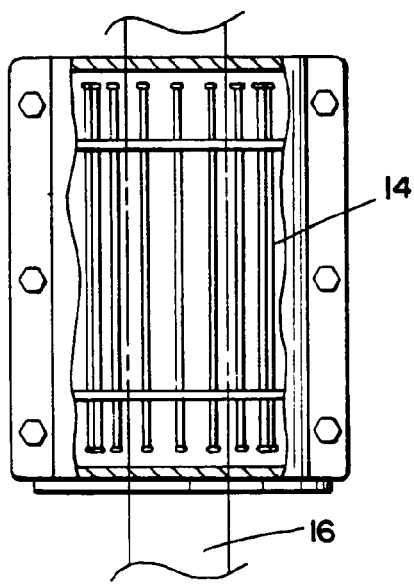
Figure 15E:
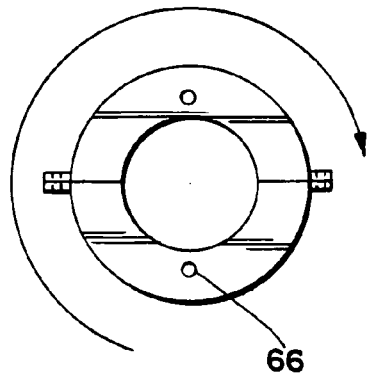
FIG. 15e is an end view of a portion of the embodiment of FIG. 15a showing means for rotating the support members.

It should be appreciated from the description herein that the present invention is neither limited by the size of the support 10 nor the size of an object to be secured in the support 10. For example, FIGS. 15a, 15b, 15c, 15d, 15e, 16a, 16b, 16c, and 16d illustrate an alternative embodiment of the invention that is suitable for large scale applications. As best illustrated in FIGS. 15b and 15c, the alternative embodiment includes a case 12 that comprises a left portion 19A and a right portion 19B, as well as an upper section 21A and a lower section 21B. The right portion 19B is secured to the left portion 19A by circular restraint notches 60 on the left portion 19A and circular restraint grooves 62 on the right portion 19B. As illustrated in FIG. 15a, the upper section 21A is secured to the lower section 21B by bolts 64. As illustrated in FIGS. 15e, 16b, 16c, and 16d, various means for rotating first ends of the support members 14 with respect to the second ends of the support members 14 may be used in the alternative embodiment. FIG. 15e illustrates holes 66 on the right end 18B that cooperate with a tool (not shown) to rotate the right portion 19B with respect to the left portion 19A. FIGS. 16b, 16c, and 16d illustrate a removable tool 68 for rotating the right portion 19B or end with respect to the left portion 19A. FIGS. 16b, 16c, and 16d illustrate a geared periphery 70 of the right end 18B that interacts with the tool 68. A lock 72 and/or a ratchet stop 74 is used to secure the rotational position of the right portion 19B with respect to the left portion 19A. FIGS. 16a and 16b also illustrate a base 76 that may be used with larger supports 10. The rotation to adjust the tension may be accomplished manually or with the assistance of mechanical, hydraulic, or other suitable devices.

The present invention also includes a method for supporting a pipe (or other object or group of objects), a method of isolating vibration in a pipe (or other object or group of objects), a method of protecting a pipe (or other object or group of objects), and a method of leveling a pipe (or other object or group of objects). By using the pipe support 10 as described herein, a pipe 16 (or other object or group of objects) may be supported, clamped, isolated from vibration, and/or protected from elements outside of the case 12 by placing the pipe 16 within the pipe support 10 and rotating the support members 14 to engage and grip the pipe 16. The support 10 may also be used to level a pipe 16 or other object because the support members 14 center an object such as a pipe 16 within the support 10 when the support members 14 are caused to engage the object.

The method of isolating vibration in an object or group of objects in accordance with the present invention may be used to control vibration in systems such as, for example, a motor, that produce vibrations. A pipe, rod, or other object is attached to the vibrating system and a support 10 in accordance with the present invention is attached to the pipe, rod, or other object. The support 10 isolates vibration in the pipe, rod, or other object and in turn isolates vibration occurring in the vibrating system.

For example, the invention provides a method of isolating vibration in a rotating object which is provided with bearing means for engaging the support. The method includes the steps of providing a support comprising a frame capable of being placed around a rotating object, a plurality of support members within the frame, means for supporting each of the plurality of support members at a minimum of two points, and means for rotating each of the support members at a first contact point with respect to a second contact point so the support members engage the bearing means associated with the rotating object; placing the frame around the object and its bearing means; and turning the rotating means to cause the support members to engage the bearing means associated with the rotating object. Alternatively, the support members may be provided with bearing means for engaging the rotating object.

The invention also provides a method for securing a rotating object while the support independently rotates within a generally cylindrical enclosure. The method includes the steps of providing a support comprising a frame capable of being secured to a rotating object, a plurality of support members within the frame, means for supporting each of the plurality of support members at a minimum of two points, means for rotating each of the support members at a first contact point with respect to a second contact point so the support members engage a rotating object placed within the frame, and contact means attached to an outer surface of the frame that allow the frame to rotate and slide within a generally cylindrical enclosure, such as a pipe; placing the frame around the rotating object; turning the rotating means to cause the support members to engage the rotating object and secure it within the frame; and placing the frame within an enclosure. The contact means may be bearings, casters, wheels, or other suitable structures that engage the interior diameter of the enclosure in a way that allows the frame to rotate or slide relative to the enclosure. Alternatively, the enclosure may be provided with an interior bearing sleeve, not shown in the drawings, that slidably engages the exterior of the frame.

The method also provides a method for isolating vibration from a vibrating object such as a motor. The method includes the steps of providing an isolator support comprising a frame capable of being placed around contacting supports attached to the vibrating object, a plurality of support members within the frame, means for supporting each of the plurality of support members at a minimum of two points, and means for rotating each of the support members at a first contact point with respect to a second contact point so the support members engage the contacting supports; placing the isolator support around the contacting supports; and turning the rotating means to cause the support means to engage the contacting supports. Depending on the application, one or more isolators may be used, with additional isolators engaging additional contacting supports attached to the vibrating object.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the invention discussed herein in connection with a pipe can be used with any other object or group of objects, which may be stationary, rotating, slidable, or both rotating and slidable. The embodiments discussed were chosen and described to provide the best illustration of the principles of the present invention and its practical application to thereby enable one of ordinary skill in the art to use the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The following is claimed:

1. A support, comprising:
a frame;
a plurality of support members within the frame;
means within the frame for supporting each of the plurality of support members at a minimum of two points, each of the plurality of support members being movable relative to said points along an axis parallel to the longitudinal axis of the object to be supported; and
means for rotating each of the plurality of support members at a first contact point with respect to a second contact point such that the support members move between a generally linear position in which the support members are spaced at a distance from an object placed within the support and a rotated position in which the support members engage at least a portion of an object placed within the support to support the object while allowing the object to move in a sliding and rotating direction relative to the frame without affecting the function of the object.

2. A pipe support for an installed pipe, comprising:
a divided frame capable of being placed around an installed pipe;
a plurality of support members within the frame;
means within the frame for supporting each of the plurality of support members at a minimum of two points, each of the plurality of support members being movable relative to said points along an axis parallel to the longitudinal axis of the installed pipe; and
means for rotating each of the plurality of support members at a first contact point with respect to a second contact point such that the support members move between a generally linear position in which the support members are spaced at a distance from an installed pipe placed within the pipe support and a rotated position in which the support members engage at least a portion of the installed pipe to support the installed pipe while allowing the installed pipe to move in a sliding and rotating direction relative to the frame.

3. A support, comprising: a frame capable of being placed around at least a portion of the object to be supported;
a plurality of support members each having opposing ends; and
means within the frame for supporting each of the plurality of support members at two opposing contact points, each of the plurality of support members being movable relative to said points along an axis parallel to the longitudinal axis of the object to be supported, the contact points being positioned so that the support members engage the enclosed portion of the object within the frame to support the object while allowing the object to move in a sliding and rotating direction relative to the frame, the ends of each of the plurality of support members extending longitudinally beyond the frame when the support members are supported by the opposing contact points.

4. A support for a rotating object, comprising:
a bearing mechanism for supporting at least a portion of the rotating object while permitting relative rotation between the rotating member and the bearing mechanism;
a frame capable of being secured about the bearing mechanism;
a plurality of support members within the frame;
means within the frame for supporting each of the plurality of support members at a minimum of two points, each of the plurality of support members being movable relative to said points along an axis parallel to the longitudinal axis of the object to be supported; and
means for rotating each of the plurality of support members at a first contact point with respect to a second contact point such that the support members move between a generally linear position in which the support members are spaced at a distance from the bearing mechanism and a rotated position in which the support members engage the bearing mechanism within the frame to support the rotating object while allowing the rotating object to move in a sliding and rotating direction relative to the frame.

5. The support according to claim 4, wherein the bearing mechanism permits sliding between the rotating member and the bearing mechanism.

6. A support for a rotating object, comprising
a frame capable of being placed around at least a portion of a rotating object;
a plurality of support members within the frame;

means within the frame for supporting each of the plurality of support members at a minimum of two points, each of the plurality of support members being movable relative to said points along an axis parallel to the longitudinal axis of the object to be supported;

means for rotating each of the plurality of support members at a first contact point with respect to a second contact point such that the support members move between a generally linear position in which the support members are spaced at a distance from a rotating object placed within the frame and a rotated position in which the support members engage at least a portion of the rotating object to support the rotating object while allowing the rotating object to move in a sliding and rotating direction relative to the frame; and contact means attached to an outer surface of the frame that allow the frame to rotate within a generally cylindrical enclosure.

7. A support for a rotating object, comprising a frame capable of being placed around at least a portion of a rotating object;

a plurality of support members within the frame;

means within the frame for supporting each of the plurality of support members at a minimum of two points, each of the plurality of support members being movable relative to said points along an axis parallel to the longitudinal axis of the object to be supported;

means for rotating each of the plurality of support members at a first contact point with respect to a second contact point such that the support members move between a generally linear position in which the support members are spaced at a distance from a rotating object placed within the frame and a rotated position in which the support members engage at least a portion of the rotating object to support the rotating object while allowing the rotating object to move in a sliding and rotating direction relative to the frame; and contact means attached to an outer surface of the frame that allow the frame to rotate and slide within a generally cylindrical enclosure.

8. An isolator support for an object provided with contacting supports, the support comprising:

a frame capable of being placed around the contacting supports;

a plurality of support members within the frame;

means within the frame for supporting each of the plurality of support members at a minimum of two points, each of the plurality of support members being movable relative to said contact points along an axis parallel to the longitudinal axis of the object to be supported; and means for rotating each of the plurality of support members at a first contact point with respect to a second contact point such that the support members move between a generally linear position in which the support members are spaced at a distance from the contacting supports and a rotated position in which the support members engage the contacting supports to support the object while allowing the object to move in a sliding and rotating direction relative to the frame.

9. A support for a vibrating object, the support comprising:

a frame capable of being placed around at least a portion of an object;

a plurality of support members within the frame;

means within the frame for supporting each of the plurality of support members at a minimum of two points, each of the plurality of support members being movable relative to points along an axis parallel to the longitudinal axis of the object to be supported; and means for rotating each of the plurality of support members at a first contact point with respect to a second contact point such that the support members move between a generally linear position in which the support members are spaced at a distance from an object placed within the frame and a rotated position in which the support members engage at least a portion of the object to support the vibrating object while allowing the vibrating object to move in a sliding and rotating direction relative to the frame, vibration occurring in the object being isolated when the support members engage at least a portion of the object.

10. A support for a vibrating, rotating object provided with bearing means, the support comprising:

a frame capable of being placed around the bearing means and associated portions of a rotating object;

a plurality of support members within the frame;

means within the frame for supporting each of the plurality of support members at a minimum of two points, each of the plurality of support members being movable with respect to said points along an axis parallel to the longitudinal axis of the object to be supported; and means for rotating each of the plurality of support members at a first contact point with respect to a second contact point such that the support members move between a generally linear position in which the support members are spaced at a distance from the bearing means and a rotated position in which the support members engage the bearing means object to support the object while allowing the object to move in a sliding and rotating direction relative to the frame, vibration occurring in the object being isolated when the support members engage the bearing means.

11. A method of supporting an object, comprising:

(a) providing a support comprising:

a frame capable of being placed around at least a portion of the object, the frame being divided along at least one axis generally perpendicular to the longitudinal axis of the object to be supported;

a plurality of support members within the frame;

means within the frame for supporting each of the plurality of support members at a minimum of two points, each of the plurality of support members being movable relative to said points along an axis parallel to the longitudinal axis of the object to be supported; and means for rotating each of the plurality of support members at a first contact point with respect to a second contact point such that the support members move between a generally linear position in which the support members are spaced at a distance from an object placed within the support and a rotated position in which the support members engage the object to support the object while allowing the object to move in a sliding and rotating direction relative to the frame;

(b) placing the support around at least a portion of the object; and (c) turning the rotating means to cause the plurality of support members to engage the enclosed portion of the object and secure it within the frame.

12. A method of supporting an installed pipe, comprising:

(a) providing a pipe support comprising:

a frame capable of being placed around at least a portion of an installed pipe;

a plurality of support members within the frame;

means within the frame for supporting each of the plurality of support members at a minimum of two points, each of the plurality of support members being movable relative to said points along an axis parallel to the longitudinal axis of the installed pipe; and means for rotating each of plurality of support members at a first contact point with respect to a second contact point such that the support members move between a generally linear position in which the support members are spaced at a distance from an installed pipe placed within the pipe support and a rotated position in which the support members engage a portion of the installed pipe to support the installed pipe while allowing the installed pipe to move in a sliding and rotating direction relative to the frame;

(b) placing the pipe support around the pipe; and (c) turning the rotating means to cause the plurality of support members to engage the enclosed potion of the pipe and secure it within the frame.

13. A method of supporting an object, comprising:

(a) providing a support comprising:
   a frame capable of being placed around at least a portion of the object;
   a plurality of support members; and
   means within the frame for supporting each of the plurality of support members at two opposing contact points;

(b) placing the support around at least a portion of the object; and (c) supporting each of the plurality of support members on the contact points such that each of the plurality of support members is movable relative to the contact points along an axis parallel to the longitudinal axis of the object to be supported, the contact points being positioned so that the plurality of support members engage the enclosed portion of the object within the frame to support the object while allowing the object to move in a sliding and rotating direction relative to the frame.

14. A method of securing a rotating object, comprising the steps of:

(a) providing a support comprising
   a bearing mechanism for supporting at least a portion of the rotating object while permitting relative rotation between the rotating member and the bearing mechanism;
   a frame capable of being secured about the bearing mechanism;
   a plurality of support members within the frame;
   means within the frame for supporting each of the plurality of support members at a minimum of two points, each of the plurality of support members being movable relative to said points along an axis parallel to the longitudinal axis of the object to be supported; and
   means for rotating each of the plurality of support members at a first contact point with respect to a second contact point such that the support members move between a generally linear position in which the support members are spaced at a distance from the bearing mechanism and a rotated position in which the support members engage the bearing mechanism to support the rotating object while allowing the rotating object to move in a sliding and rotating direction relative to the frame;

(b) supporting at least a portion of the rotating object on the bearing mechanism;

(c) placing the frame around the bearing mechanism; and (d) turning the rotating means to cause the plurality of support members to engage the bearing mechanism and secure it within the frame.

15. A method of securing a rotating object, comprising the steps of:

(a) providing a support comprising
   a bearing mechanism for supporting at least a portion of the rotating object while permitting relative rotation and sliding between the rotating member and the bearing mechanism;
   a frame capable of being secured about the bearing mechanism;
   a plurality of support members within the frame;
   means within the frame for supporting each of the plurality of support members at a minimum of two points, each of the plurality of support members being movable with respect to said points along an axis parallel to the longitudinal axis of the object to be supported; and
   means for rotating each of the plurality of support members at a first contact point with respect to a second contact point such that the support members move between a generally linear position in which the support members are spaced at a distance from the bearing mechanism and a rotated position in which the support members engage the bearing mechanism to support the rotating object while allowing the rotating object to move in a sliding and rotating direction relative to the frame;

(b) supporting at least a portion of the rotating object on the bearing mechanism;

(c) placing the frame around the bearing mechanism; and (d) turning the rotating means to cause the plurality of support members to engage the bearing mechanism and secure it within the frame.

16. A method of supporting a rotating object, comprising the steps of:

(a) providing a support comprising
   a frame capable of being placed around at least a portion of a rotating object;
   a plurality of support members within the frame;
   means within the frame for supporting each of the plurality of support members at a minimum of two points, each of the plurality of support members being movable relative to said contact points along an axis parallel to the longitudinal axis of the object to be supported;
   means for rotating each of the plurality of support members at a first contact point with respect to a second contact point such that the support members move between a generally linear position in which the support members are spaced at a distance from a rotating object placed within the frame and a rotated position in which the support members engage at least a portion of the rotating object to support the rotating object while allowing the rotating object to move in a sliding and rotating direction relative to the frame; and
   contact means attached to an outer surface of the frame that allow the frame to rotate within a generally cylindrical enclosure;

(b) placing the frame around at least a portion of the rotating object;

(c) turning the rotating means to cause the plurality of support members to engage the enclosed portion of the rotating object and secure it within the frame; and (d) placing the frame within a generally cylindrical enclosure.

17. A method of supporting a rotating object, comprising the steps of:
(a) providing a support comprising
a frame capable of being placed around at least a portion of a rotating object;
a plurality of support members within the frame;
means within the frame for supporting each of the plurality of support members at a minimum of two points, each of the plurality of support members being movable relative to said points along an axis parallel to the longitudinal axis of the object to be supported;
means for rotating each of the plurality of support members at a first contact point with respect to a second contact point such that the support members move between a generally liner position in which the support members are spaced at a distance from a rotating object placed within the frame and a rotated position in which the support members engage at least a portion of the rotating object to support the rotating object while allowing the rotating object to move in a sliding and rotating direction relative to the frame; and
contact means attached to an outer surface of the frame that allow the frame to rotate and slide within a generally cylindrical enclosure;
(b) placing the frame around at least a portion of the rotating object;
(c) turning the rotating means to cause the plurality of support members to engage the enclosed portion of the rotating object and secure it within the frame; and
(d) placing the frame within a generally cylindrical enclosure.

18. A method of isolating vibration from an object provided with contacting supports, the method comprising the steps of:
(a) providing an isolator support comprising
a frame capable of being placed around the contacting supports;
a plurality of support members within the frame;
means within the frame for supporting each of the plurality of support members at a minimum of two points, each of the plurality of support members being movable relative to said points along an axis parallel to the longitudinal axis of the object to be supported; and
means for rotating each of the plurality of support members at a first contact point with respect to a second contact point such that the support members move between a generally linear position in which the support members are spaced at a distance from the contacting supports and a rotated position in which the support members engage the contacting supports to support the object while allowing the object to move in a sliding and rotating direction relative to the frame;
(b) placing the isolator support around the contacting supports; and
(c) turning the rotating means to cause the plurality of support members to engage the contacting supports such that vibration occurring in the object is isolated by the plurality of support members.

19. A method of isolating vibration in an object, the method comprising the steps of:
(a) providing a support comprising:
a frame capable of being placed around at least a portion of an object;
a plurality of support members within the frame;
means within the frame for supporting each of the plurality of support members at a minimum of two points, each of the plurality of support members being movable relative to said points along an axis parallel to the longitudinal axis of the object to be supported; and
means for rotating each of the plurality of support members at a first contact point with respect to a second contact point such that the support members move between a generally linear position in which the support members are spaced at a distance from an object placed within the frame and a rotated position in which the support members engage at least a portion of the object to support the object while allowing the object to move in a sliding and rotating direction relative to the frame;
(b) placing the frame around at least a portion of the object; and
(c) turning the rotating means to secure the enclosed portion of the object such that vibration occurring in the object is isolated by the plurality of support members.

20. A method of isolating vibration in a rotating object provided with bearing means, the method comprising the steps of:
(a) providing a support comprising a frame capable of being placed around the bearing means and on a rotating object;
a plurality of support members within the frame;
means within the frame for supporting each of the plurality of support members at a minimum of two points, each of the plurality of support members being movable relative to said contact points along an axis parallel to the longitudinal axis of the object to be supported; and
means for rotating each of the plurality of support members at a first contact point with respect to a second contact point such that the support members move between a generally linear position in which the support members are spaced at a distance from the bearing means and a rotated position in which the support members engage the bearing means to support the rotating object while allowing the rotating object to move in a sliding and rotating direction relative to the frame;
(b) placing the frame around the bearing means and associated portion of the rotating object; and
(c) turning the rotating means to cause the plurality of support members to engage the bearing means such that vibration occurring in the object is isolated by the plurality of support members.

* * * * *